(12) United States Patent
Shih

(10) Patent No.: US 9,046,639 B2
(45) Date of Patent: Jun. 2, 2015

(54) SLIM LENS ASSEMBLY

(71) Applicants: Sintai Optical (Shenzhen) Co., Ltd., Shenzhen, Guandong Province (CN); Asia Optical International Ltd., Tortola (GB)

(72) Inventor: Po-Yuan Shih, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 47 days.

(21) Appl. No.: 13/958,670

(22) Filed: Aug. 5, 2013

(65) Prior Publication Data

US 2014/0085735 A1    Mar. 27, 2014

(30) Foreign Application Priority Data

Sep. 26, 2012 (TW) .............................. 101135236 A

(51) Int. Cl.
| | | |
|---|---|---|
| *G02B 3/02* | (2006.01) | |
| *G02B 13/04* | (2006.01) | |
| *G02B 3/04* | (2006.01) | |
| *G02B 3/00* | (2006.01) | |
| *G02B 9/60* | (2006.01) | |
| *G02B 13/00* | (2006.01) | |
| *G02B 13/18* | (2006.01) | |

(52) U.S. Cl.
CPC .. *G02B 3/04* (2013.01); *G02B 3/00* (2013.01); *G02B 9/60* (2013.01); *G02B 13/0015* (2013.01); *G02B 13/18* (2013.01); *G02B 13/0045* (2013.01); *G02B 13/04* (2013.01)

(58) Field of Classification Search
CPC ...... G02B 13/0045; G02B 9/60; G02B 13/18; G02B 13/04; G02B 3/04; G02B 13/0015
USPC ................................. 359/714, 740, 753, 770
See application file for complete search history.

(56) References Cited

U.S. PATENT DOCUMENTS

2013/0308206 A1 *  11/2013  Hsu et al. ...................... 359/714

FOREIGN PATENT DOCUMENTS

| | | |
|---|---|---|
| JP | 01223408 A | 9/1989 |
| JP | 2010211228 A | 9/2010 |
| JP | 201392775 A | 5/2013 |

OTHER PUBLICATIONS

English Abstract translation of JP2010211228 (Published Sep. 24, 2010).
English Abstract translation of JP01223408 (Published Sep. 6, 1989).
English Abstract translation of JP201392775 (Published May 16, 2013).

* cited by examiner

*Primary Examiner* — Evelyn A Lester
(74) *Attorney, Agent, or Firm* — McClure, Qualey & Rodack, LLP

(57) ABSTRACT

A slim lens assembly includes a first lens, a second lens, a third lens, a fourth lens and a fifth lens, all of which are arranged in sequence from an object side to an image side along an optical axis. The first lens is a convex-concave lens with negative refractive power and includes a convex surface facing the object side and a concave surface facing the image side. The second lens is with positive refractive power. The third lens is a biconcave lens with negative refractive power. The fourth lens is a biconvex lens with positive refractive power. The fifth lens is a convex-concave lens with negative refractive power and includes a convex surface facing the object side and a concave surface facing the image side.

18 Claims, 20 Drawing Sheets

SLIM LENS ASSEMBLY

BACKGROUND OF THE INVENTION

1. Field of the Invention

The invention relates to a slim lens assembly.

2. Description of the Related Art

In recent years, portable electronic products have been gradually developed toward miniaturization and lightweight for people to carry and use conveniently. The lens assemblies that are used for portable electronic products also require miniaturization and lightweight. In addition to miniaturization and lightweight, higher optical performance that can achieve high image quality is required. In conclusion, miniaturization, lightweight and high optical performance are essential elements to a lens assembly.

In order to achieve the purposes of miniaturization, lightweight and high optical performance, aspheric plastic lens begins to be used in some lens assemblies. From the beginning of using one or two aspheric plastic lenses, to the present of only using aspheric plastic lens in some lens assemblies, the use of aspheric plastic lenses for lens design has become a trend.

The developed lens assembly structure that includes four aspheric plastic lenses can't meet all application requirements. There are some optical specifications such as F-number, field of view and total track need to be improved in order to meet some specific application requirements.

BRIEF SUMMARY OF THE INVENTION

The invention provides a slim lens assembly which has the optical specifications of a smaller F-number, a larger field of view and a shortened total track, has good optical performance and can be mass produced. This kind of slim lens assembly has both characteristics of thinness and high optical performance.

The slim lens assembly in accordance with an exemplary embodiment of the invention includes a first lens, a second lens, a third lens, a fourth lens and a fifth lens, all of which are arranged in sequence from an object side to an image side along an optical axis. The first lens is a convex-concave lens with negative refractive power and includes a convex surface facing the object side and a concave surface facing the image side. The second lens is with positive refractive power. The third lens is a biconcave lens with negative refractive power. The fourth lens is a biconvex lens with positive refractive power. The fifth lens is a convex-concave lens with negative refractive power and includes a convex surface facing the object side and a concave surface facing the image side.

In another exemplary embodiment, the slim lens assembly satisfies the following conditions:

$$0.2560 \leq BFL/TT \leq 0.3052 \quad (1)$$

$$0.2883 \leq (R_{11}-R_{12})/(R_{11}+R_{12}) \leq 0.3866 \quad (2)$$

$$-3.0946 \leq f_1/f \leq -1.7388 \quad (3)$$

$$-1.6692 \leq (R_{21}-R_{22})/(R_{21}+R_{22}) \leq -0.7398 \quad (4)$$

$$0.9108 \leq f_2/f \leq 1.1103 \quad (5)$$

$$1.2989 \leq (R_{41}-R_{42})/(R_{41}+R_{42}) \leq 1.7796 \quad (6)$$

$$0.4745 \leq f_4/f \leq 0.7912 \quad (7)$$

wherein BFL is the back focal length of the slim lens assembly, TT is the distance from the convex surface of the first lens to the image plane along the optical axis, $R_{11}$ is the radius of curvature of the convex surface of the first lens, $R_{12}$ is the radius of curvature of the concave surface of the first lens, f is the effective focal length of the slim lens assembly, $f_1$ is the effective focal length of the first lens, $R_{21}$ is the radius of curvature of the object side surface of the second lens, $R_{22}$ is the radius of curvature of the image side surface of the second lens, $f_2$ is the effective focal length of the second lens, $R_{41}$ is the radius of curvature of the object side surface of the fourth lens, $R_{42}$ is the radius of curvature of the image side surface of the fourth lens and $f_4$ is the effective focal length of the fourth lens.

In another exemplary embodiment, the first lens is made of plastic material or glass material.

In yet another exemplary embodiment, the first lens includes a convex surface and a concave surface, at least one of which is an aspheric surface.

In another exemplary embodiment, the second lens is a biconvex lens.

In yet another exemplary embodiment, the second lens is a convex-concave lens.

In another exemplary embodiment, the second lens is made of plastic material or glass material.

In yet another exemplary embodiment, the second lens includes two surfaces, at least one of which is an aspheric surface.

In another exemplary embodiment, the third lens is made of plastic material or glass material.

In yet another exemplary embodiment, the third lens includes two concave surfaces, at least one of which is an aspheric surface.

In another exemplary embodiment, the fourth lens is made of plastic material or glass material.

In yet another exemplary embodiment, the fourth lens includes two convex surfaces, at least one of which is an aspheric surface.

In another exemplary embodiment, the fifth lens is made of plastic material or glass material.

In yet another exemplary embodiment, the fifth lens includes a convex surface and a concave surface, at least one of which is an aspheric surface.

In another exemplary embodiment, the fifth lens includes two surfaces, at least one of which is an inflecting surface.

In yet another exemplary embodiment, the slim lens assembly future includes an optical filter disposed between the fifth lens and the image side.

In another exemplary embodiment, the slim lens assembly future includes a stop disposed between the second lens and the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The aspheric surface sag z of each lens for all of the preferred embodiments of the invention can be calculated by the following formula:

$$z = \frac{ch^2}{1+[1-(k+1)c^2h^2]^{1/2}} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

Figure 1:
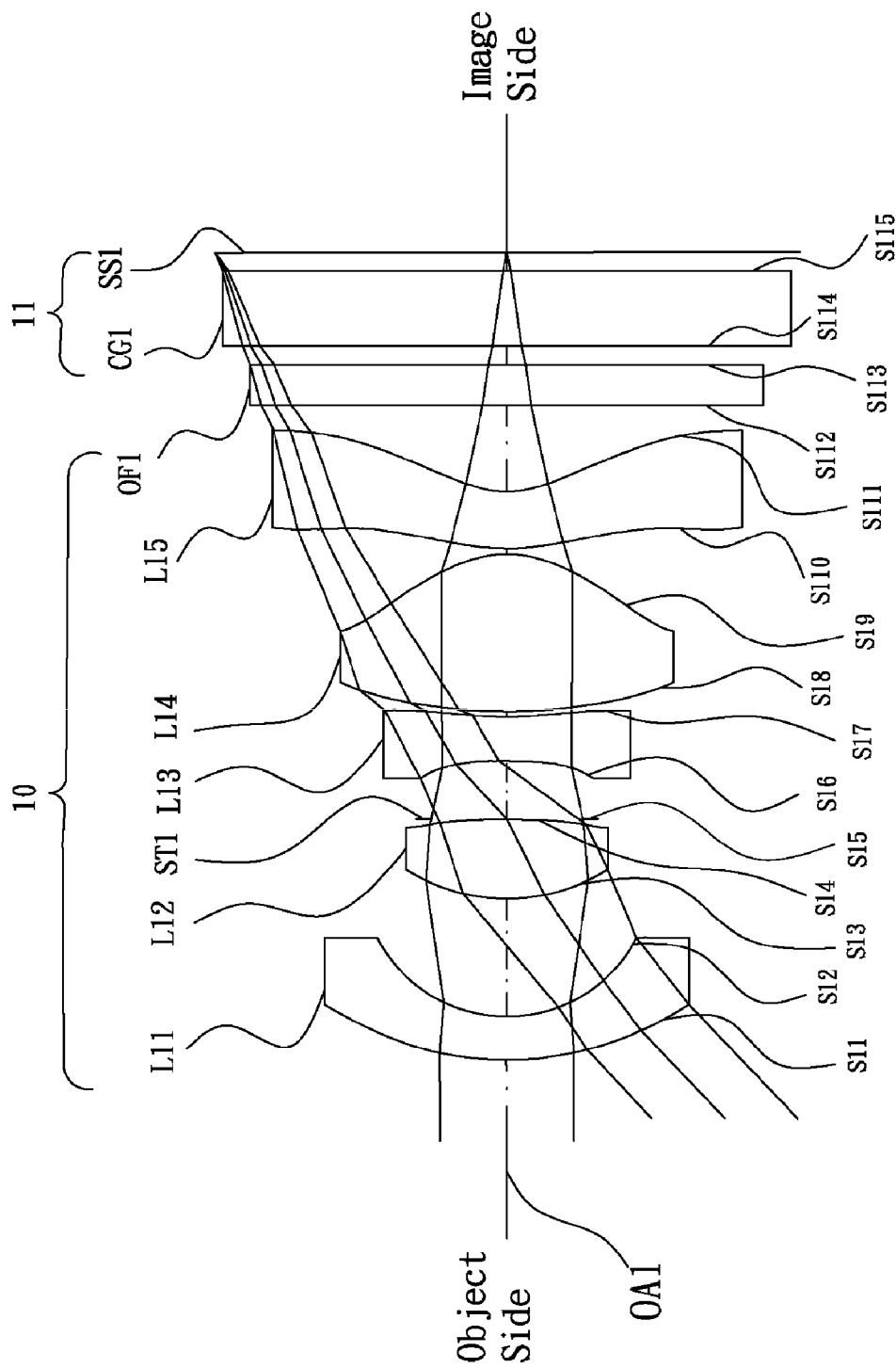
FIG. 1 is a lens layout and optical path diagram of a slim lens assembly in accordance with a first embodiment of the invention.

Referring to FIG. 1, FIG. 1 is a lens layout and optical path diagram of the slim lens assembly in accordance with a first embodiment of the invention. The Slim lens assembly 10 includes a first lens L11, a second lens L12, a stop ST1, a third lens L13, a fourth lens L14, a fifth lens L15 and a optical filter OF1, all of which are arranged in sequence from an object side to an image side along an optical axis OA1. An image sensor 11 is disposed between the optical filter OF1 and the image side. A sensing surface SS1 of the image sensor 11 is disposed in the image plane. The first lens L11 is made of plastic material. The first lens L11 is a convex-concave lens with negative refractive power, the convex surface S11 of the first lens L11 faces the object side and the concave surface S12 of the first lens L11 faces the image side, wherein both of the convex surface S11 and concave surface S12 are aspheric surfaces. The second lens L12 is made of plastic material. The second lens L12 is a biconvex lens with positive refractive power, the convex surface S13 and convex surface S14 of the second lens L12 both are aspheric surfaces. The third lens L13 is made of plastic material. The third lens L13 is a biconcave lens with negative refractive power, the concave surface S16 and concave surface S17 of the third lens L13 both are aspheric surfaces. The fourth lens L14 is made of plastic material. The fourth lens L14 is a biconvex lens with positive refractive power, the convex surface S18 and convex surface S19 of the fourth lens L14 both are aspheric surfaces. The fifth lens L15 is made of plastic material. The fifth lens L15 is a convex-concave lens with negative refractive power, the convex surface S110 of the fifth lens L15 faces the object side and the concave surface S111 of the fifth lens L15 faces the image side, wherein both of the convex surface S110 and concave surface S111 are aspheric surfaces and the convex surface S110 is an inflecting surface. The optical filter OF1 is made of glass material. The surface S112 and surface S113 of the optical filter OF1 both are plane surfaces. The image sensor 11 includes a cover glass CG1 and a sensor element (not shown). The cover glass CG1 includes a surface S114 and a surface S115 both are plane surfaces, is used to protect sensor surface SS1 of the sensor element from scratch or dust adhesion. By the above design of the lenses and stop ST1, the slim lens assembly 10 which has the optical specifications of a smaller F-number, a larger field of view and a shortened total track, still has high optical performance.

In order to achieve the above purpose and effectively enhance the optical performance, the slim lens assembly 10 of the first embodiment of the invention is provided with the optical specifications shown in Table 1, which include the effective focal length, F-number, total track, field of view, radius of curvature of each lens surface, thickness of each lens, refractive index of each lens and Abbe number of each lens.

TABLE 1

Effective Focal Length = 1.694 mm
F-number = 2.4
Field of View = 87°
Total Track = 4.280 mm

| Surface Number | Radius of Curvature (mm) | Thickness (mm) | Nd | Vd | Remark |
|---|---|---|---|---|---|
| S11 | 1.74693 | 0.230 | 1.535 | 56.1 | The First Lens L11 |
| S12 | 0.79376 | 0.624 | | | |
| S13 | 1.00475 | 0.419 | 1.535 | 56.1 | The Second Lens L12 |
| S14 | −4.00764 | 0.002 | | | |
| S15 | ∞ | 0.311 | | | Stop ST1 |
| S16 | −2.86496 | 0.230 | 1.636 | 23.9 | The Third Lens L13 |

TABLE 1-continued

Effective Focal Length = 1.694 mm
F-number = 2.4
Field of View = 87°
Total Track = 4.280 mm

| Surface Number | Radius of Curvature (mm) | Thickness (mm) | Nd | Vd | Remark |
|---|---|---|---|---|---|
| S17 | 1.56465 | 0.030 | | | |
| S18 | 2.49475 | 0.834 | 1.535 | 56.1 | The Fourth Lens L14 |
| S19 | −0.55194 | 0.030 | | | |
| S110 | 1.22797 | 0.300 | 1.535 | 56.1 | The Fifth Lens L15 |
| S111 | 0.46981 | 0.461 | | | |
| S112 | ∞ | 0.210 | 1.517 | 64.2 | Optical Filter OF1 |
| S113 | ∞ | 0.100 | | | |
| S114 | ∞ | 0.400 | 1.517 | 64.2 | Cover Glass CG1 |
| S115 | ∞ | 0.100 | | | |

In the present embodiment, the conic constant k and the aspheric coefficients A~G of each surface are shown in Table 2.

TABLE 2

| Surface Number | k | A | B | C | D | E | F | G |
|---|---|---|---|---|---|---|---|---|
| S11 | −1.03672E+00 | 8.68810E−02 | −1.11140E−01 | 1.59310E−01 | −1.04454E−01 | −1.23733E−01 | 2.10148E−01 | −9.08955E−02 |
| S12 | 0.00000E+00 | 9.90241E−02 | −1.41522E−01 | 6.05453E−01 | −7.22986E−01 | 2.05564E−01 | 6.81827E−01 | 1.38198E+00 |
| S13 | 0.00000E+00 | 2.52229E−02 | 3.52731E−01 | −2.24628E+00 | 7.10331E+00 | −1.57962E+00 | −6.72301E+01 | 9.92663E+01 |
| S14 | 0.00000E+00 | −1.87441E−01 | −7.77828E−01 | 5.61159E+00 | −6.69794E+00 | −3.90382E+01 | −3.52207E+02 | 1.77180E+03 |
| S16 | 0.00000E+00 | −1.56203E+00 | 2.79683E+00 | −1.17165E+01 | 1.56338E+01 | 7.75125E−01 | 8.68475E+01 | −4.67851E+02 |
| S17 | −2.97964E+01 | −3.88466E−01 | 4.15435E−01 | −3.57249E−01 | 6.17644E−01 | −1.99481E−01 | −1.13396E+00 | 2.06927E+00 |
| S18 | 0.00000E+00 | −1.14828E−01 | 7.26886E−02 | 2.02058E−01 | −1.47408E−01 | −1.06779E−01 | 1.78191E−01 | −5.66128E−02 |
| S19 | −3.60623E+00 | −4.49717E−01 | 5.05004E−01 | −7.59286E−02 | 3.03574E−02 | 1.41013E−01 | 3.94567E−02 | −1.40011E−01 |
| S110 | −6.84306E+00 | −2.59139E−01 | 1.28575E−01 | −1.65842E−02 | −2.13472E−02 | 1.32083E−02 | 1.03480E−02 | −6.25981E−03 |
| S111 | −4.13007E+00 | −1.95553E−01 | 1.04154E−01 | −4.39914E−02 | 1.10445E−02 | 5.29075E−04 | −1.31211E−03 | 4.50176E−04 |

The slim lens assembly 10 of the present embodiment wherein the effective focal length f=1.694 mm, BFL=1.271 mm, TT=4.280 mm, $R_{11}$=1.74693 mm, $R_{12}$=0.79376 mm, $f_1$=−2.96186 mm, $R_{21}$=1.00475 mm, $R_{22}$=−4.00764 mm, $f_2$=1.542819 mm, $R_{41}$=2.49475 mm, $R_{42}$=−0.55194 mm and $f_4$=0.931672 mm. The calculated values of various conditions fully satisfy the requirements of condition (1), condition (2), condition (3), condition (4), condition (5), condition (6) and condition (7) which are listed in BRIEF SUMMARY OF THE INVENTION. The calculated values of various conditions are as below:

BFL/$TT$=0.2970

$(R_{11}-R_{12})/(R_{11}+R_{12})$=0.3752

$f_1/f$=−1.7484

$(R_{21}-R_{22})/(R_{21}+R_{22})$=−1.6692

$f_2/f$=0.9108

$(R_{41}-R_{42})/(R_{41}+R_{42})$=1.5682

$f_4/f$=0.5500

Figure 2A:
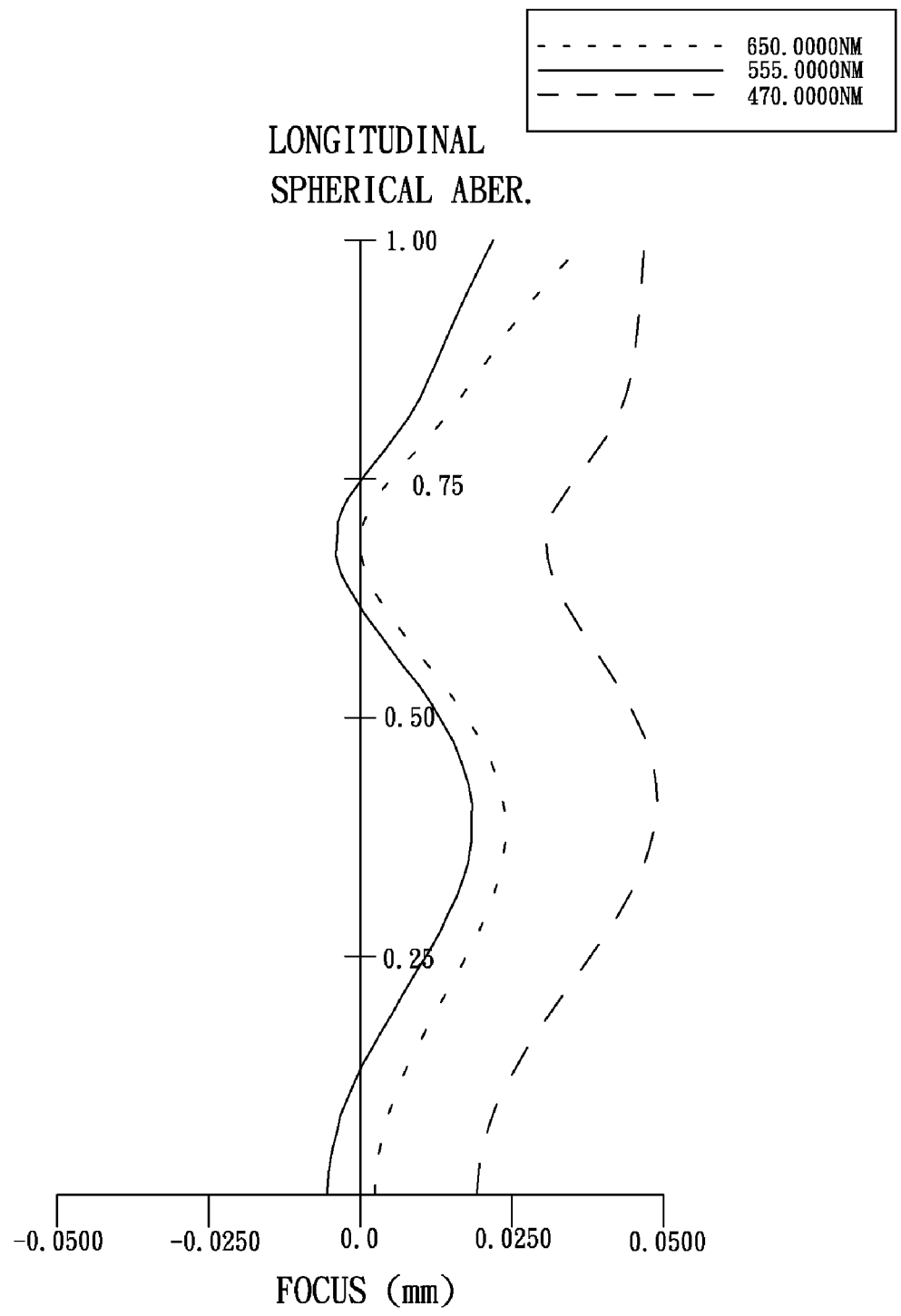
FIG. 2A is a longitudinal spherical aberration diagram of a slim lens assembly in accordance with a first embodiment of the invention.
Figure 2B:
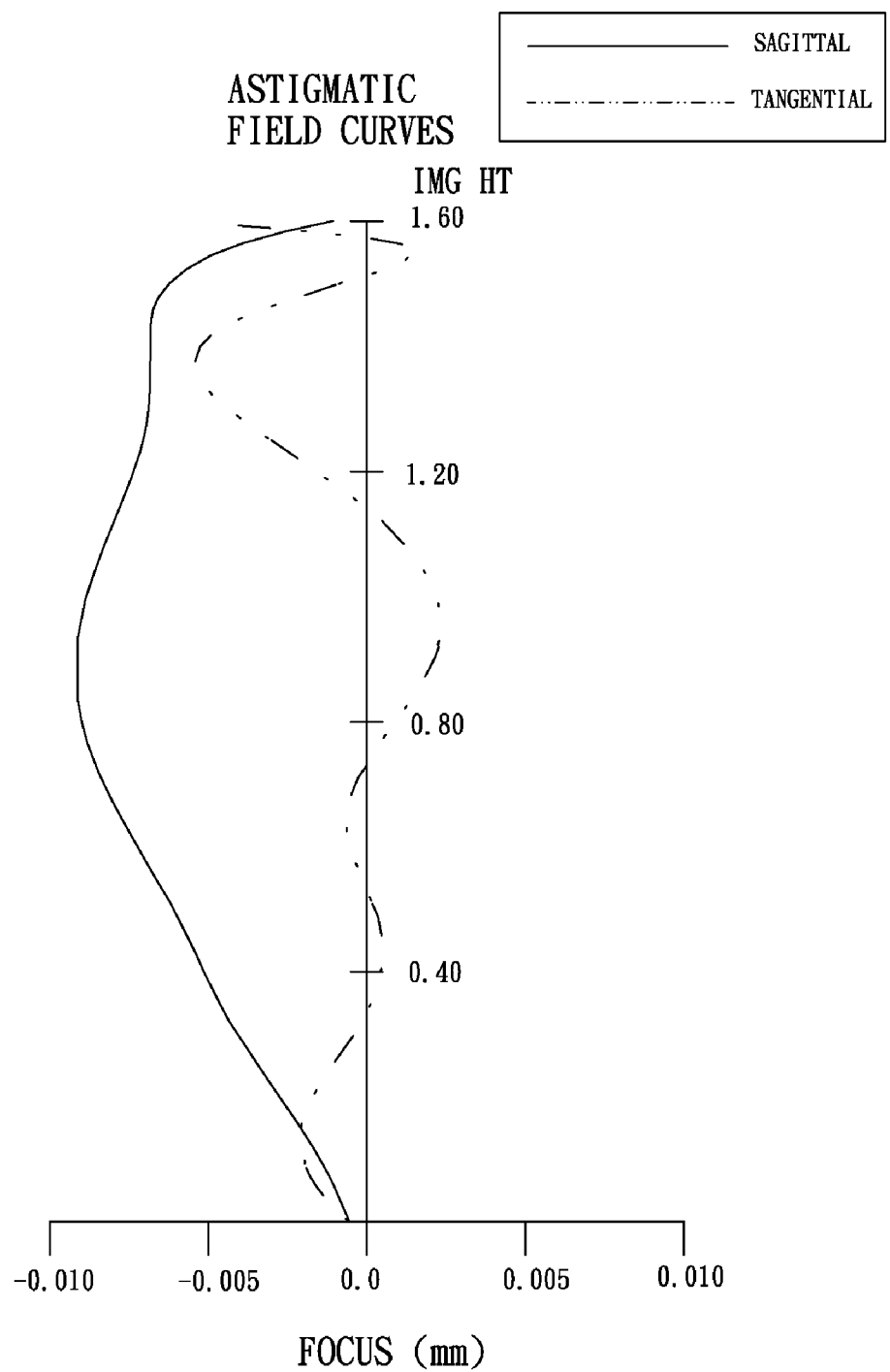
FIG. 2B is an astigmatic field curves diagram of a slim lens assembly in accordance with a first embodiment of the invention.
Figure 2C:
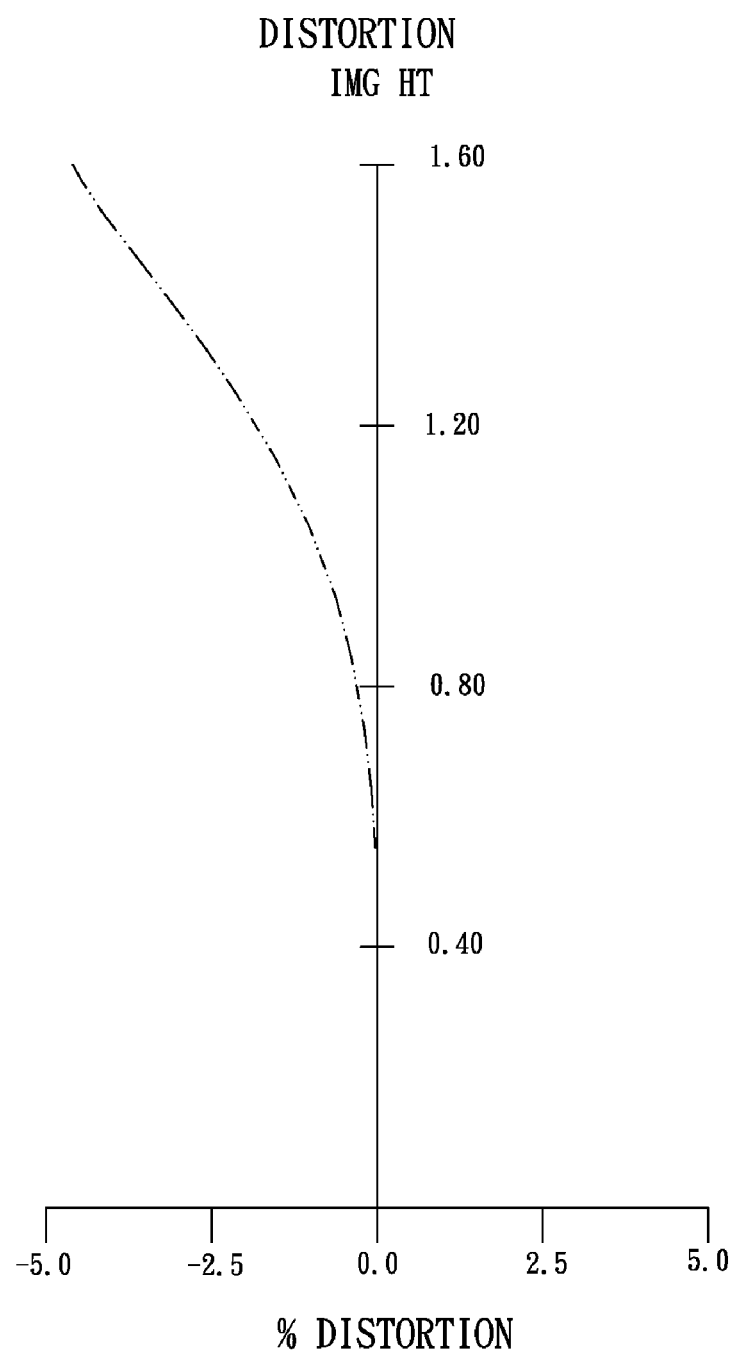
FIG. 2C is a distortion diagram of a slim lens assembly in accordance with a first embodiment of the invention.

By the above arrangements of the lenses and stop ST1, the slim lens assembly 10 of the present embodiment can meet the requirements of optical performance as seen in FIGS. 2A-2C, wherein FIG. 2A shows the longitudinal spherical aberration of the slim lens assembly 10 of the present embodiment, FIG. 2B shows the astigmatic field curves of the slim lens assembly 10 of the present embodiment and FIG. 2C shows the distortion of the slim lens assembly 10 of the present embodiment.

It can be seen from FIG. 2A that the longitudinal spherical aberration in the present embodiment ranges between −0.005 mm to 0.005 mm for the wavelength range between 470 nm to 650 nm. It can be seen from FIG. 2B that the astigmatic field curves of tangential direction and sagittal direction in the present embodiment ranges between −0.01 mm to 0.01 mm. It can be seen from FIG. 2C that the distortion in the present embodiment does not exceed plus or minus 5%. It is obvious that the longitudinal spherical aberration, the astigmatic field curves and the distortion of the slim lens assembly 10 of the present embodiment can be corrected effectively and results in better optical performance.

Figure 3:
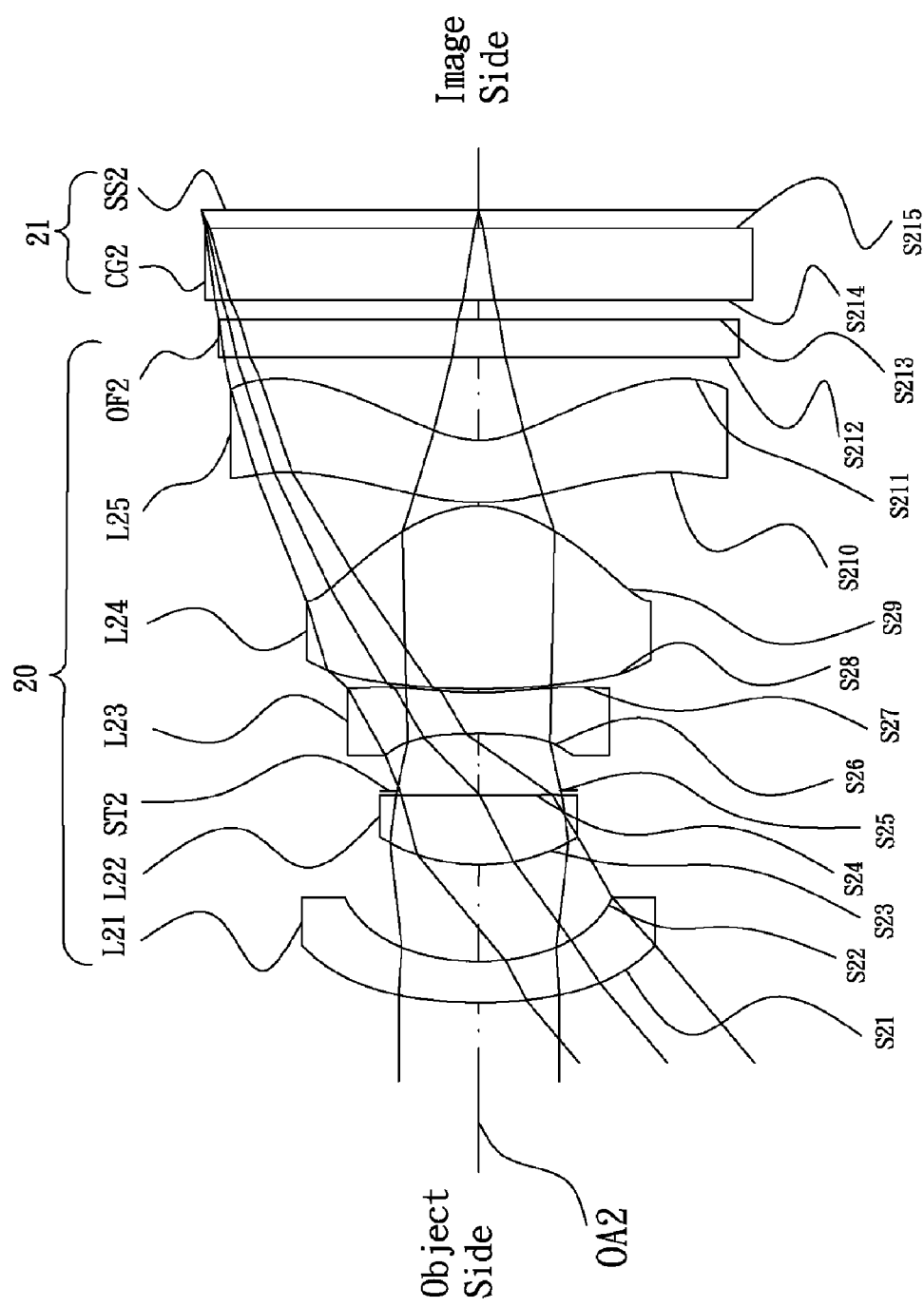
FIG. 3 is a lens layout and optical path diagram of a slim lens assembly in accordance with a second embodiment of the invention.

Referring to FIG. 3, FIG. 3 is a lens layout and optical path diagram of the slim lens assembly in accordance with a second embodiment of the invention. The Slim lens assembly 20 includes a first lens L21, a second lens L22, a stop ST2, a third lens L23, a fourth lens L24, a fifth lens L25 and a optical filter OF2, all of which are arranged in sequence from an object side to an image side along an optical axis OA2. An image sensor 21 is disposed between the optical filter OF2 and the image side. A sensing surface SS2 of the image sensor 21 is disposed in the image plane. The first lens L21 is made of plastic material. The first lens L21 is a convex-concave lens with negative refractive power, the convex surface S21 of the first lens L21 faces the object side and the concave surface S22 of the first lens L21 faces the image side, wherein both of the convex surface S21 and concave surface S22 are aspheric surfaces. The second lens L22 is made of plastic material. The second lens L22 is a convex-concave lens with positive refractive power, the convex surface S23 of the second lens L22 faces the object side and the convex surface S24 of the second lens L22 faces the image side, wherein both of the convex surface S23 and concave surface S24 are aspheric surfaces. The third lens L23 is made of plastic material. The third lens L23 is a biconcave lens with negative refractive power, the concave surface S26 and concave surface S27 of the third lens L23 both are aspheric surfaces. The fourth lens L24 is made of plastic material. The fourth lens L24 is a biconvex lens with positive refractive power, the convex surface S28 and convex surface S29 of the fourth lens L24 both are aspheric surfaces. The fifth lens L25 is made of plastic material. The fifth lens L25 is a convex-concave lens with negative refractive power, the convex surface S210 of the fifth lens L25 faces the object side and the concave surface S211 of the fifth lens L25 faces the image side, wherein both of the convex surface S210 and concave surface S211 are aspheric surfaces and both of the convex surface S210 and concave surface S211 are inflecting surfaces. The optical filter OF2 is made of glass material. The surface S212 and surface S213 of the optical filter OF2 both are plane surfaces. The image sensor 21 includes a cover glass CG2 and a sensor element (not shown). The cover glass CG2 includes a surface S214 and a surface S215 both are plane surfaces, is used to protect sensor surface SS2 of the sensor element from scratch or dust adhesion. By the above design of the lenses and stop ST2, the slim lens assembly 20 which has the optical specifications of a smaller F-number, a larger field of view and a shortened total track, still has high optical performance.

In order to achieve the above purpose and effectively enhance the optical performance, the slim lens assembly 20 of the second embodiment of the invention is provided with the optical specifications shown in Table 3, which include the effective focal length, F-number, total track, field of view, radius of curvature of each lens surface, thickness of each lens, refractive index of each lens and Abbe number of each lens.

TABLE 3

Effective Focal Length = 1.88262 mm
F-number = 2.1
Field of View = 80°
Total Track = 4.431 mm

| Surface Number | Radius of Curvature (mm) | Thickness (mm) | Nd | Vd | Remark |
|---|---|---|---|---|---|
| S21 | 2.69709 | 0.230 | 1.525 | 56.0 | The First Lens L21 |
| S22 | 1.30663 | 0.541 | | | |
| S23 | 1.08086 | 0.391 | 1.544 | 56.1 | The Second Lens L22 |
| S24 | 17.89381 | 0.004 | | | |
| S25 | ∞ | 0.337 | | | Stop ST2 |
| S26 | −3.89586 | 0.230 | 1.632 | 23.4 | The Third Lens L23 |
| S27 | 1.77497 | 0.020 | | | |
| S28 | 3.23151 | 1.025 | 1.515 | 57.0 | The Fourth Lens L24 |
| S29 | −0.53716 | 0.020 | | | |
| S210 | 1.23669 | 0.346 | 1.532 | 56.0 | The Fifth Lens L25 |
| S211 | 0.46371 | 0.477 | | | |
| S212 | ∞ | 0.210 | 1.517 | 64.2 | Optical Filter OF2 |
| S213 | ∞ | 0.100 | | | |
| S214 | ∞ | 0.400 | 1.517 | 64.2 | Cover Glass CG2 |
| S215 | ∞ | 0.100 | | | |

In the present embodiment, the conic constant k and the aspheric coefficients A~G of each surface are shown in Table 4.

The slim lens assembly 20 of the present embodiment wherein the effective focal length f=1.88262 mm, BFL=1.287 mm, TT=4.431 mm, $R_{11}$=2.69709 mm, $R_{12}$=1.30663 mm, $f_1$=−5.100522 mm, $R_{21}$=1.08086 mm, $R_{22}$=17.89381 mm, $f_2$=2.090202 mm, $R_{41}$=3.23151 mm, $R_{42}$=−0.53716 mm and $f_4$=0.983162 mm. The calculated values of various conditions fully satisfy the requirements of condition (1), condition (2), condition (3), condition (4), condition (5), condition (6) and condition (7) which are listed in BRIEF SUMMARY OF THE INVENTION. The calculated values of various conditions are as below:

$BFL/TT = 0.2905$ $(R_{11}-R_{12})(R_{11}+R_{12}) = 0.3473$ $f_1/f = -2.7093$ $(R_{21}-R_{22})/(R_{21}+R_{22}) = -0.8861$ $f_2/f = 1.1103$ $(R_{41}-R_{42})/(R_{41}+R_{42}) = 1.3987$ $f_4/f = 0.5222$

Figure 4A:
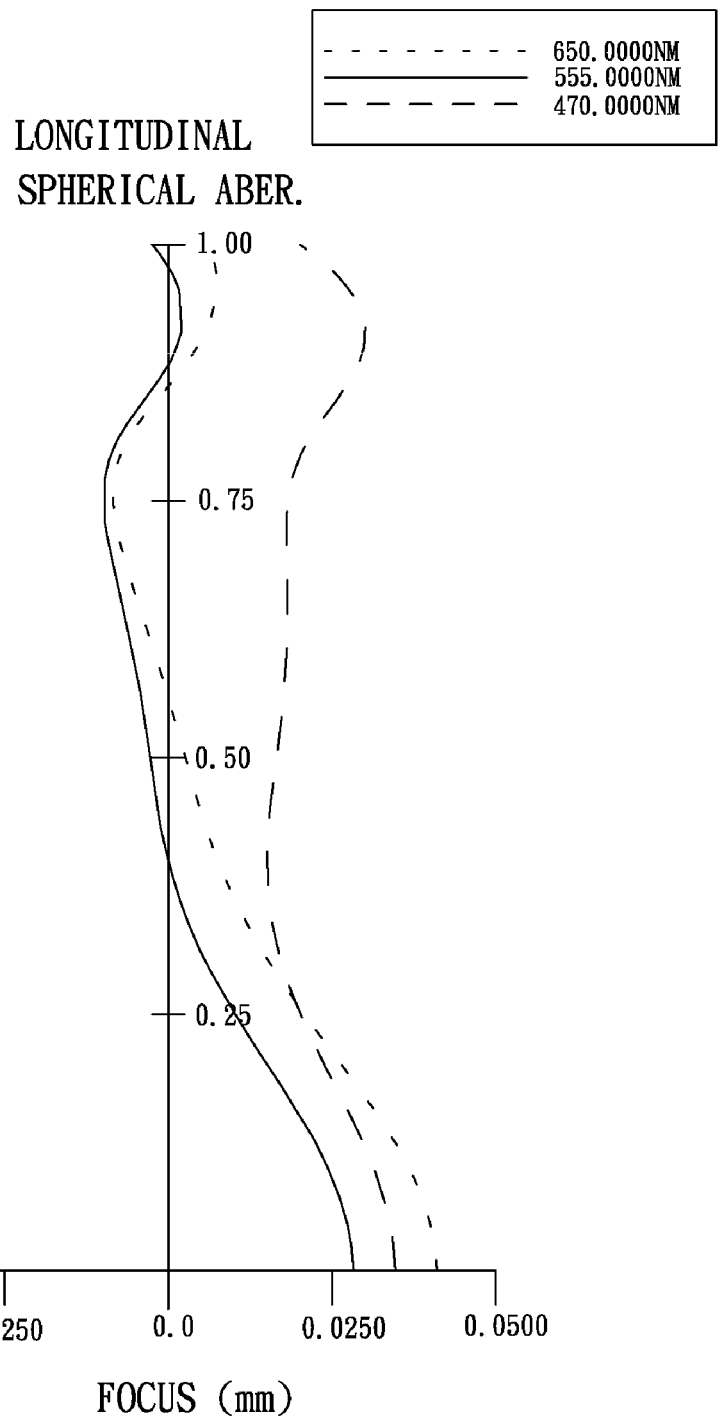
FIG. 4A is a longitudinal spherical aberration diagram of a slim lens assembly in accordance with a second embodiment of the invention.
Figure 4B:
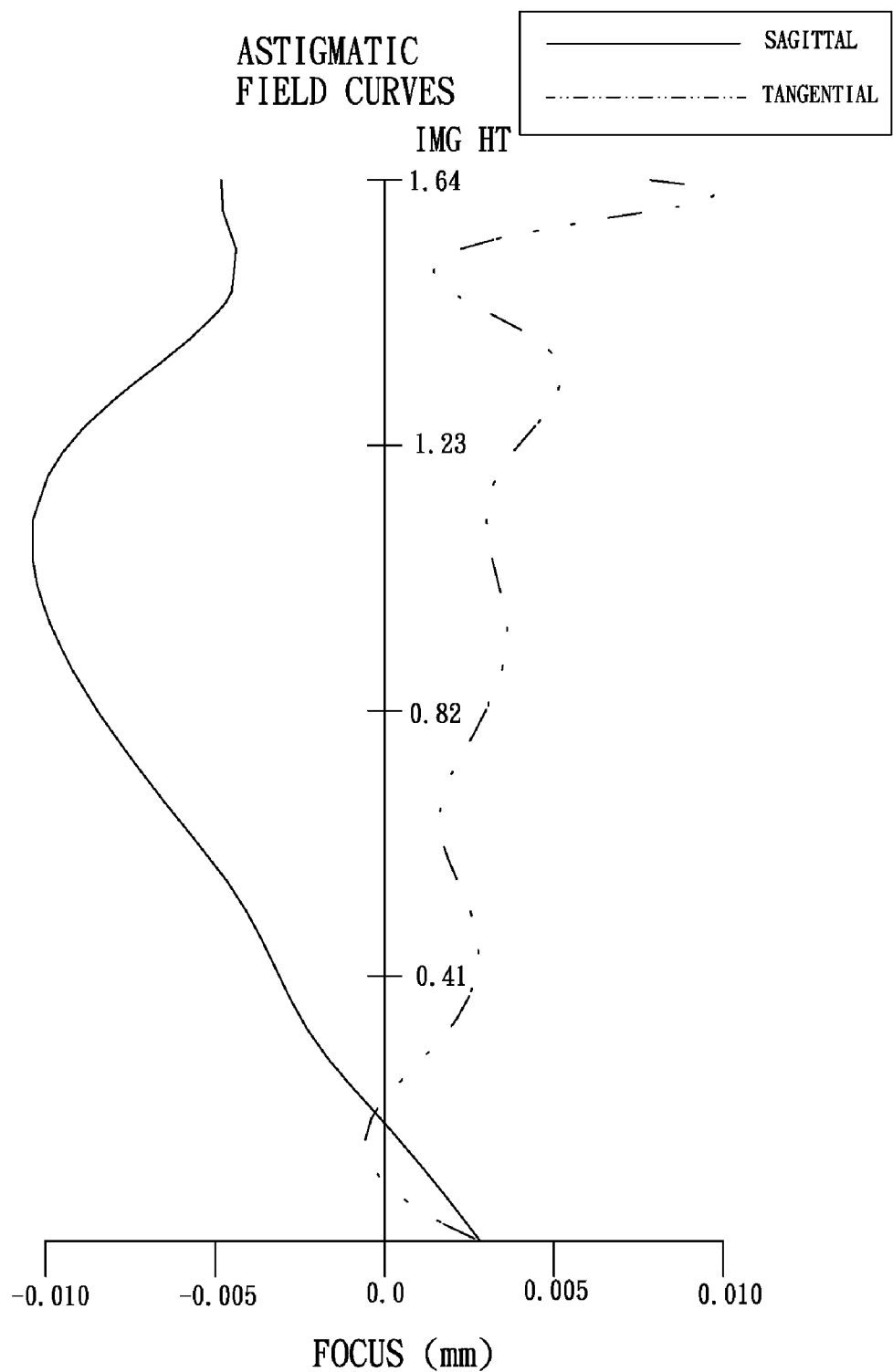
FIG. 4B is an astigmatic field curves diagram of a slim lens assembly in accordance with a second embodiment of the invention.
Figure 4C:
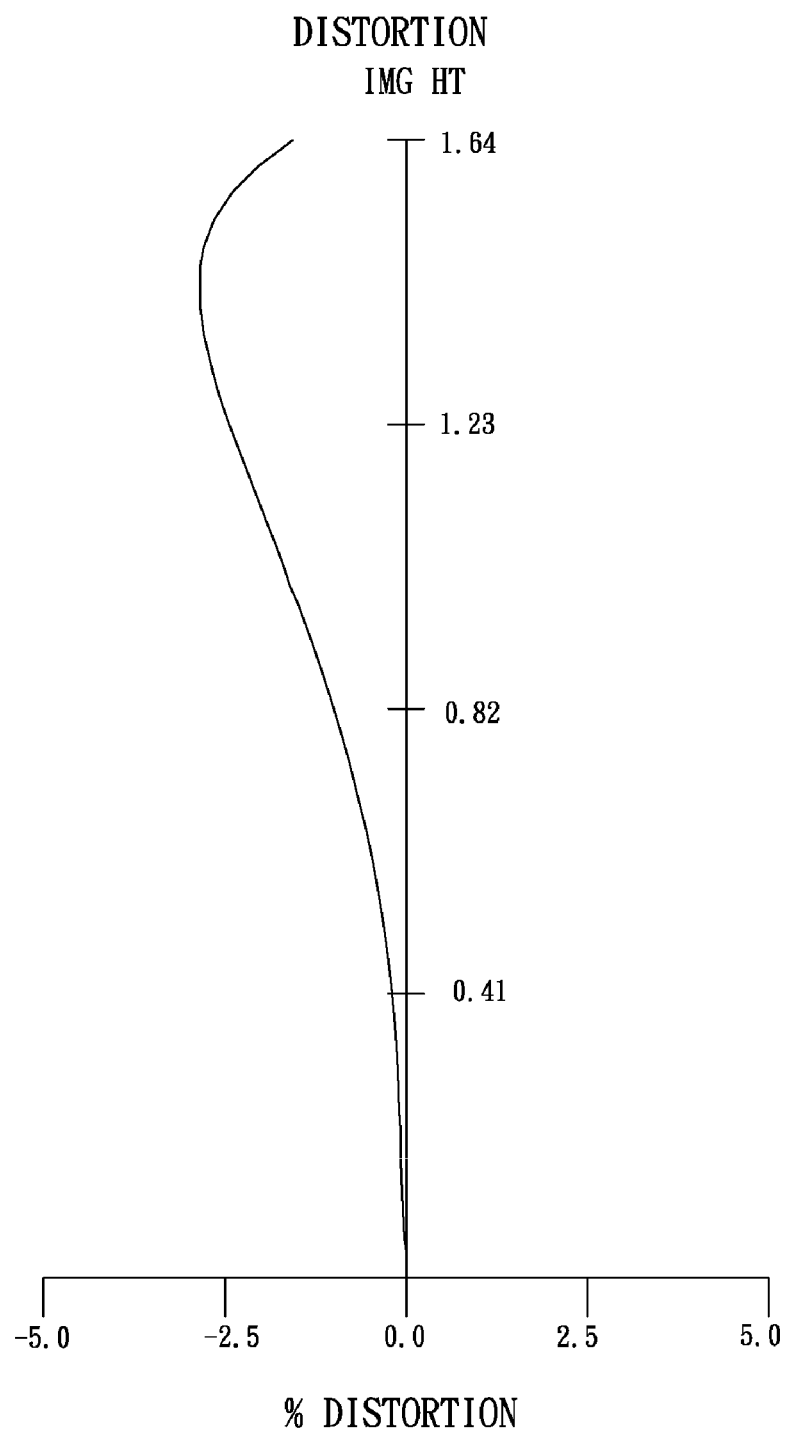
FIG. 4C is a distortion diagram of a slim lens assembly in accordance with a second embodiment of the invention.

By the above arrangements of the lenses and stop ST2, the slim lens assembly 20 of the present embodiment can meet the requirements of optical performance as seen in FIGS. 4A-4C, wherein FIG. 4A shows the longitudinal spherical aberration of the slim lens assembly 20 of the present embodiment, FIG. 4B shows the astigmatic field curves of the slim lens assembly 20 of the present embodiment and FIG. 4C shows the distortion of the slim lens assembly 20 of the present embodiment.

It can be seen from FIG. 4A that the longitudinal spherical aberration in the present embodiment ranges between −0.0025 mm to 0.005 mm for the wavelength range between 470 nm to 650 nm. It can be seen from FIG. 4B that the astigmatic field curves of tangential direction and sagittal direction in the present embodiment ranges between −0.01 mm to 0.01 mm. It can be seen from FIG. 4C that the distortion in the present embodiment does not exceed plus or minus 5%. It is obvious that the longitudinal spherical aberration, the astigmatic field curves and the distortion of the slim lens assembly 20 of the present embodiment can be corrected effectively and results in better optical performance.

TABLE 4

| Surface Number | k | A | B | C | D | E | F | G |
|---|---|---|---|---|---|---|---|---|
| S21 | −4.39746E+00 | 1.35386E−01 | −1.40620E−02 | 1.04841E−01 | −9.84092E−02 | −3.48617E−02 | 1.96253E−01 | −1.19462E−01 |
| S22 | 0.00000E+00 | 1.48926E−01 | 1.49991E−01 | 2.72808E−01 | −2.18826E−01 | 5.32512E−01 | 6.54827E−01 | 1.35023E+00 |
| S23 | 0.00000E+00 | 1.80802E−03 | 2.02861E−01 | 1.14747E−01 | −7.42348E−01 | 3.41062E+00 | −1.28476E+00 | −4.81488E+00 |
| S24 | 0.00000E+00 | −1.63235E−01 | −1.23685E−01 | 5.83950E−01 | −1.83919E−01 | −5.65425E−01 | −4.44073E+00 | −6.45840E−01 |
| S26 | 0.00000E+00 | −1.23743E+00 | 1.45780E+00 | −5.67770E+00 | 4.13475E+00 | 3.61692E−01 | 3.13013E+00 | −1.58289E+00 |
| S27 | −3.25316E+01 | −3.41237E−01 | 2.66984E−01 | −1.39377E−01 | −9.40311E−02 | 3.28711E−01 | 4.94995E−01 | −7.04954E−01 |
| S28 | 0.00000E+00 | −1.20728E−01 | 6.77689E−02 | 2.17182E−01 | −1.01940E−01 | −1.04839E−01 | 1.01297E−01 | −2.26902E−02 |
| S29 | −3.21056E+00 | −4.26344E−01 | 3.65135E−01 | −1.67677E−01 | 1.38782E−02 | 1.45857E−01 | 7.69914E−02 | −6.65587E−02 |
| S210 | −5.39935E+00 | −1.74615E−01 | 9.43986E−02 | −9.28072E−03 | −2.37686E−02 | 2.39528E−03 | 5.26031E−03 | −1.10088E−03 |
| S211 | −3.85869E+00 | −1.68571E−01 | 9.24963E−02 | −4.79325E−02 | 9.61363E−03 | 1.66219E−04 | −7.96961E−04 | 2.42628E−04 |

Figure 5:
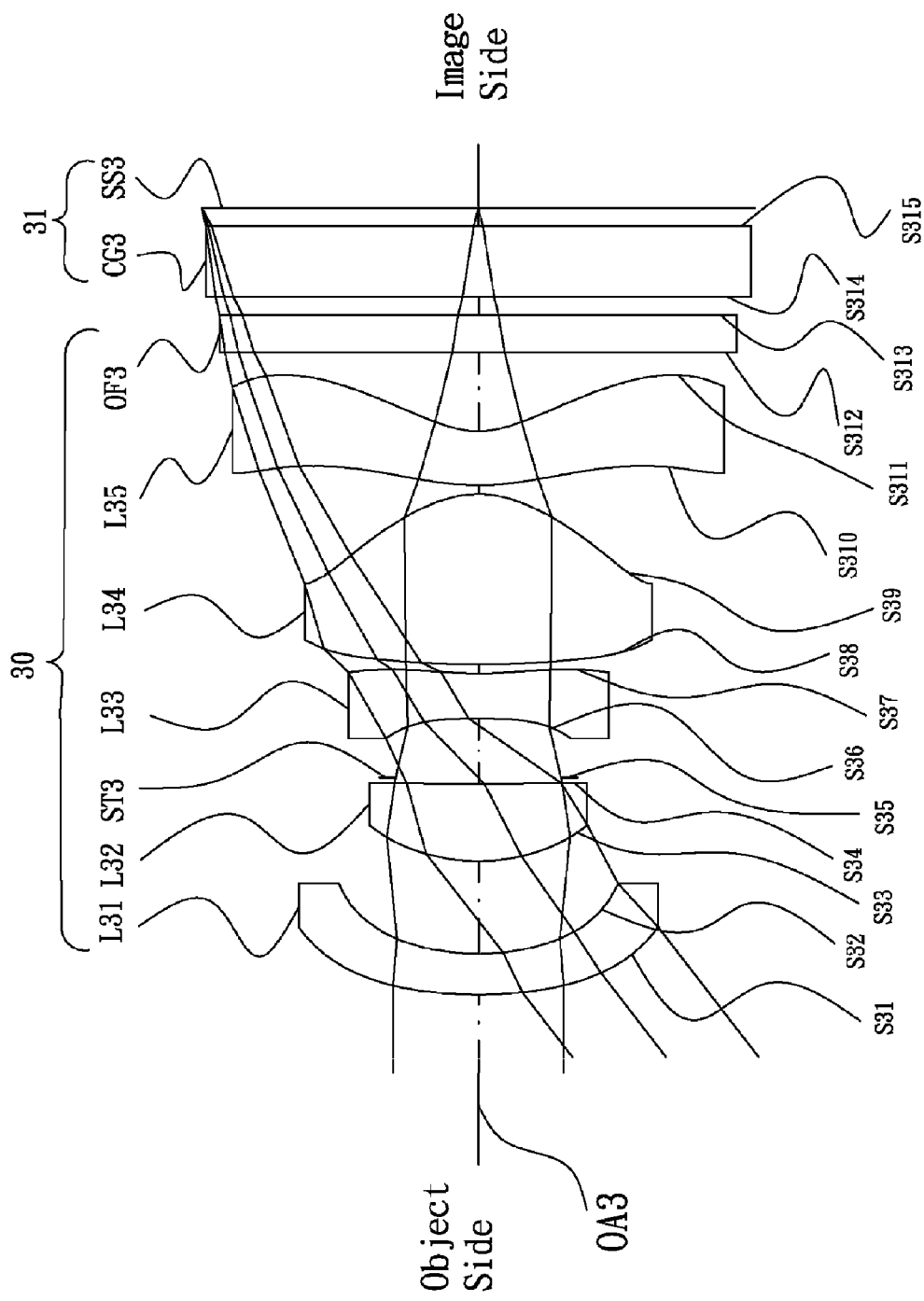
FIG. 5 is a lens layout and optical path diagram of a slim lens assembly in accordance with a third embodiment of the invention.

Referring to FIG. 5, FIG. 5 is a lens layout and optical path diagram of the slim lens assembly in accordance with a third embodiment of the invention. The Slim lens assembly 30 includes a first lens L31, a second lens L32, a stop ST3, a third lens L33, a fourth lens L34, a fifth lens L35 and a optical filter OF3, all of which are arranged in sequence from an object side to an image side along an optical axis OA3. An image sensor 31 is disposed between the optical filter OF3 and the image side. A sensing surface SS3 of the image sensor 31 is disposed in the image plane. The first lens L31 is made of plastic material. The first lens L31 is a convex-concave lens with negative refractive power, the convex surface S31 of the first lens L31 faces the object side and the concave surface S32 of the first lens L31 faces the image side, wherein both of the convex surface S31 and concave surface S32 are aspheric surfaces. The second lens L32 is made of plastic material. The second lens L32 is a convex-concave lens with positive refractive power, the convex surface S33 of the second lens L32 faces the object side and the concave surface S34 of the second lens L32 faces the image side, wherein both of the convex surface S33 and concave surface S34 are aspheric surfaces. The third lens L33 is made of plastic material. The third lens L33 is a biconcave lens with negative refractive power, the concave surface S36 and concave surface S37 of the third lens L33 both are aspheric surfaces. The fourth lens L34 is made of plastic material. The fourth lens L34 is a biconvex lens with positive refractive power, the convex surface S38 and convex surface S39 of the fourth lens L34 both are aspheric surfaces. The fifth lens L35 is made of plastic material. The fifth lens L35 is a convex-concave lens with negative refractive power, the convex surface S310 of the fifth lens L35 faces the object side and the concave surface S311 of the fifth lens L35 faces the image side, wherein both of the convex surface S310 and concave surface S311 are aspheric surfaces and both of the convex surface S310 and concave surface S311 are inflecting surfaces. The optical filter OF3 is made of glass material. The surface S312 and surface S313 of the optical filter OF3 both are plane surfaces. The image sensor 31 includes a cover glass CG3 and a sensor element (not shown). The cover glass CG3 includes a surface S314 and a surface S315 both are plane surfaces, is used to protect sensor surface SS3 of the sensor element from scratch or dust adhesion. By the above design of the lenses and stop ST3, the slim lens assembly 30 which has the optical specifications of a smaller F-number, a larger field of view and a shortened total track, still has high optical performance.

In order to achieve the above purpose and effectively enhance the optical performance, the slim lens assembly 30 of the third embodiment of the invention is provided with the optical specifications shown in Table 5, which include the effective focal length, F-number, total track, field of view, radius of curvature of each lens surface, thickness of each lens, refractive index of each lens and Abbe number of each lens.

TABLE 5

Effective Focal Length = 2.00349 mm
F-number = 2.0
Field of View = 75°
Total Track = 4.416 mm

| Surface Number | Radius of Curvature (mm) | Thickness (mm) | Nd | Vd | Remark |
|---|---|---|---|---|---|
| S31 | 2.54694 | 0.230 | 1.544 | 56.1 | The First Lens L31 |
| S32 | 1.40693 | 0.519 | | | |
| S33 | 1.06534 | 0.433 | 1.544 | 56.1 | The Second Lens L32 |
| S34 | 9.21641 | 0.035 | | | |
| S35 | ∞ | 0.333 | | | Stop ST3 |
| S36 | −3.55382 | 0.251 | 1.614 | 25.6 | The Third Lens L33 |
| S37 | 2.07094 | 0.050 | | | |
| S38 | 4.18838 | 0.957 | 1.544 | 56.1 | The Fourth Lens L34 |
| S39 | −0.54457 | 0.050 | | | |
| S310 | 1.42506 | 0.303 | 1.544 | 56.1 | The Fifth Lens L35 |
| S311 | 0.46881 | 0.443 | | | |
| S312 | ∞ | 0.210 | 1.517 | 64.2 | Optical Filter OF3 |
| S313 | ∞ | 0.100 | | | |
| S314 | ∞ | 0.400 | 1.517 | 64.2 | Cover Glass CG3 |
| S315 | ∞ | 0.100 | | | |

In the present embodiment, the conic constant k and the aspheric coefficients A~G of each surface are shown in Table 6.

TABLE 6

| Surface Number | k | A | B | C | D | E | F | G |
|---|---|---|---|---|---|---|---|---|
| S31 | −5.78726E+00 | 1.55463E−01 | −1.73329E−03 | 9.27205E−02 | −9.88070E−02 | −2.16276E−02 | 2.07490E−01 | −1.28509E−01 |
| S32 | 0.00000E+00 | 1.54048E−01 | 1.24746E−01 | 3.09230E−01 | −1.69113E−01 | 8.92526E−02 | 6.25875E−01 | 1.35023E+00 |
| S33 | 0.00000E+00 | −1.21549E−02 | 2.76236E−01 | −3.56946E−01 | 1.45128E−01 | 3.41062E+00 | −1.28476E+00 | −4.81488E+00 |
| S34 | 0.00000E+00 | −1.33303E−01 | −1.62327E−01 | 7.62530E−01 | 1.39438E−01 | −5.65425E−01 | −4.44073E+00 | −6.45840E−01 |
| S36 | 0.00000E+00 | −1.13877E+00 | 1.25317E+00 | −5.60963E+00 | 6.22852E+00 | 3.61692E−01 | 3.13013E+00 | −1.58289E+00 |
| S37 | −4.21804E+01 | −3.69536E−01 | 2.53696E−01 | −9.38471E−02 | −1.91917E−02 | 3.34054E−01 | 3.38996E−01 | −7.04954E−01 |
| S38 | 0.00000E+00 | −1.16794E−01 | 7.39890E−02 | 2.17623E−01 | −1.05776E−01 | −1.11150E−01 | 9.74665E−02 | −1.60674E−02 |
| S39 | −3.55858E+00 | −4.04259E−01 | 3.74833E−01 | −1.61306E−01 | 8.78373E−03 | 1.33317E−01 | 6.53220E−02 | −7.07647E−02 |
| S310 | −7.15840E+00 | −2.06369E−01 | 1.00420E−01 | −4.71107E−03 | −2.23964E−02 | 2.61270E−03 | 5.17314E−03 | −1.26513E−03 |
| S311 | −4.15364E+00 | −1.79927E−01 | 9.56212E−02 | −4.78103E−02 | 9.76658E−03 | 2.13109E−04 | −8.09542E−04 | 2.37813E−04 |

The slim lens assembly 30 of the present embodiment wherein the effective focal length f=2.00349 mm, BFL=1.253 mm, TT=4.416 mm, $R_{11}$=2.54694 mm, $R_{12}$=1.40693 mm, $f_1$=−6.199968 mm, $R_{21}$=1.06534 mm, $R_{22}$=9.21641 mm, $f_2$=2.166097 mm, $R_{41}$=4.18838 mm, $R_{42}$=−0.54457 mm and $f_4$=0.95069872 mm. The calculated values of various conditions fully satisfy the requirements of condition (1), condition (2), condition (3), condition (4), condition (5), condition (6) and condition (7) which are listed in BRIEF SUMMARY OF THE INVENTION. The calculated values of various conditions are as below:

$BFL/TT$=0.2838

$(R_{11}-R_{12})/(R_{11}+R_{12})$=0.2883

$f_1/f=-3.0946$ $(R_{21}-R_{22})/(R_{21}+R_{22})=-0.7928$ $f_2/f=1.0812$ $(R_{41}-R_{42})/(R_{41}+R_{42})=1.2989$ $f_4/f=0.4745$

Figure 6A:
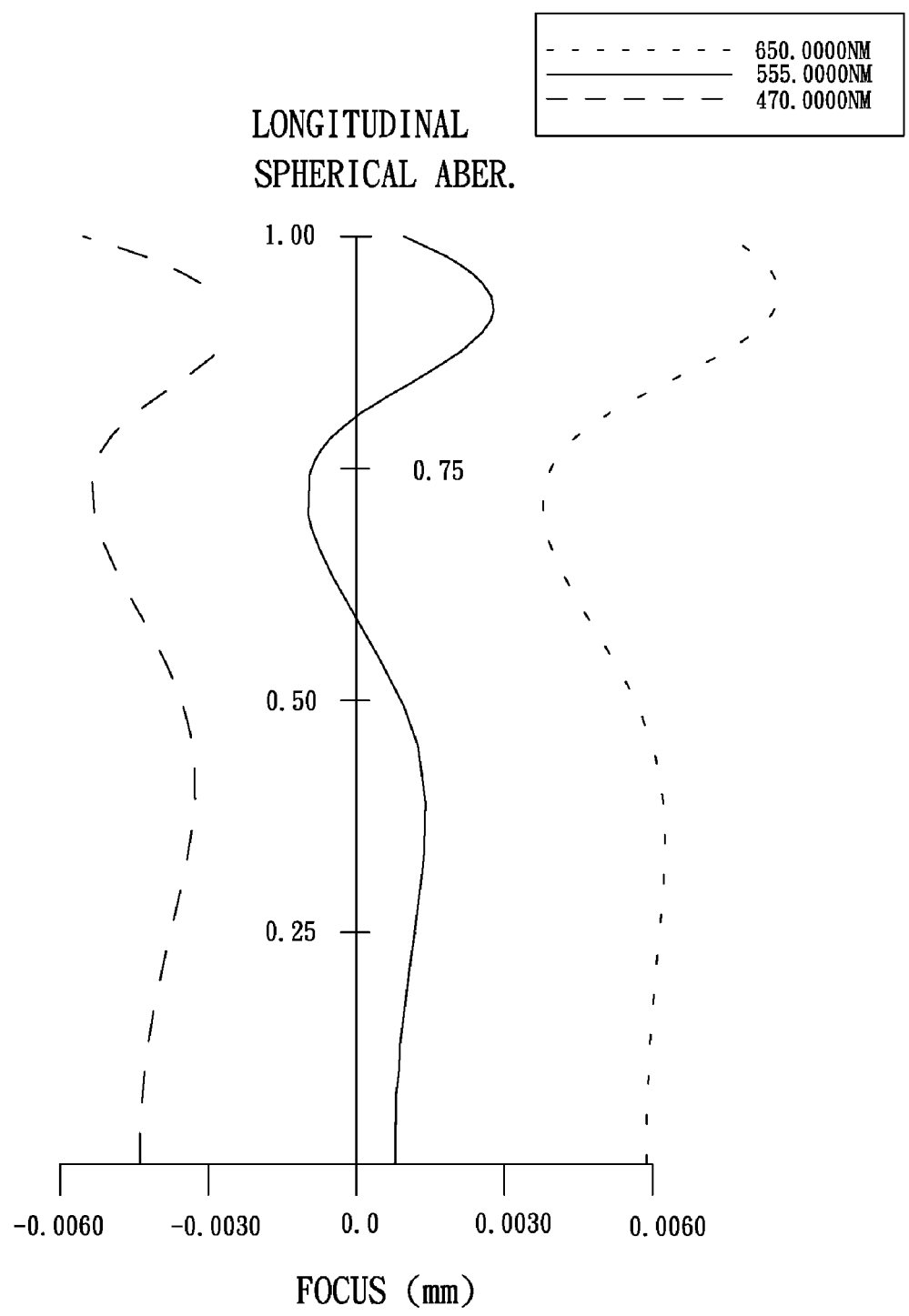
FIG. 6A is a longitudinal spherical aberration diagram of a slim lens assembly in accordance with a third embodiment of the invention.
Figure 6B:
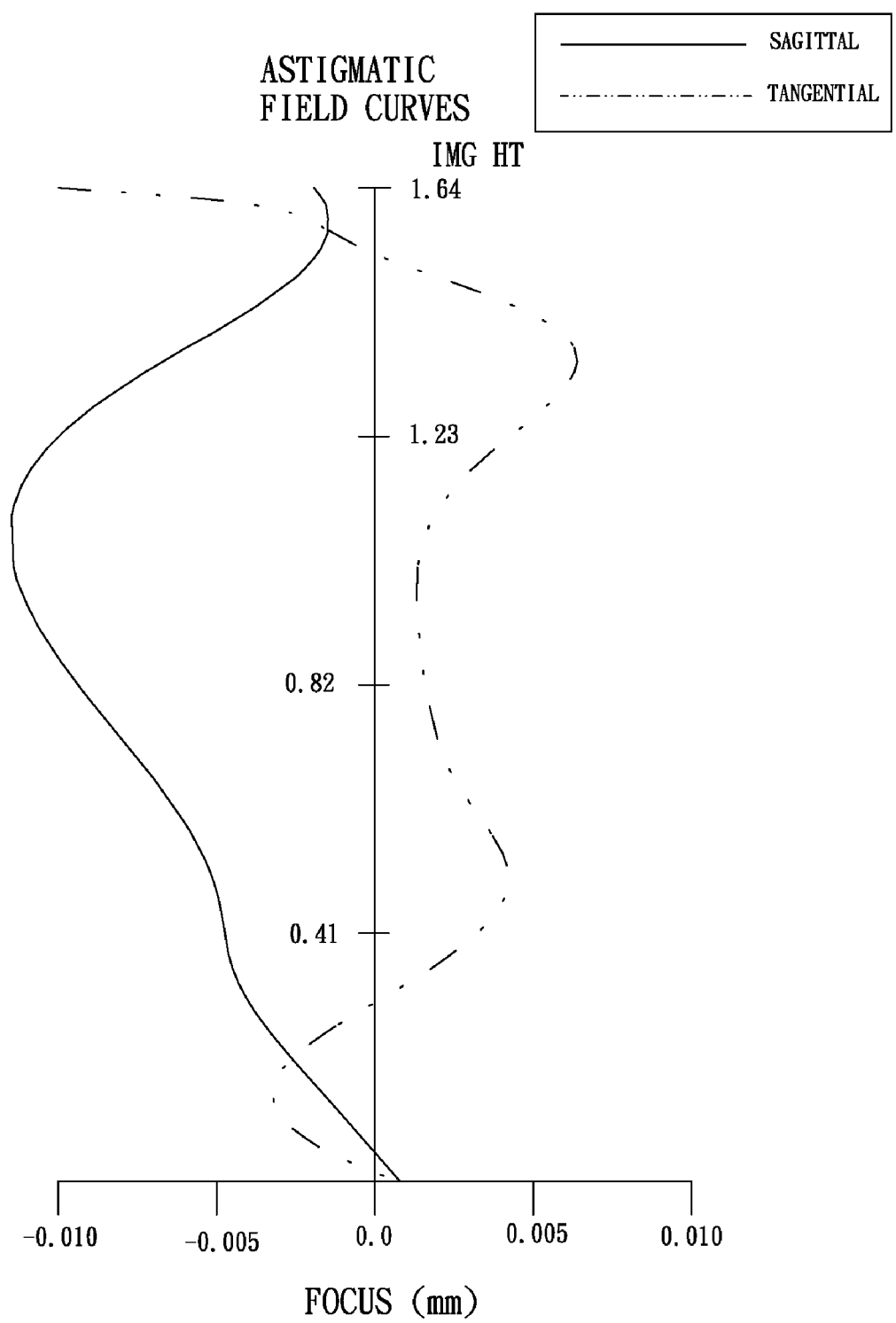
FIG. 6B is an astigmatic field curves diagram of a slim lens assembly in accordance with a third embodiment of the invention.
Figure 6C:
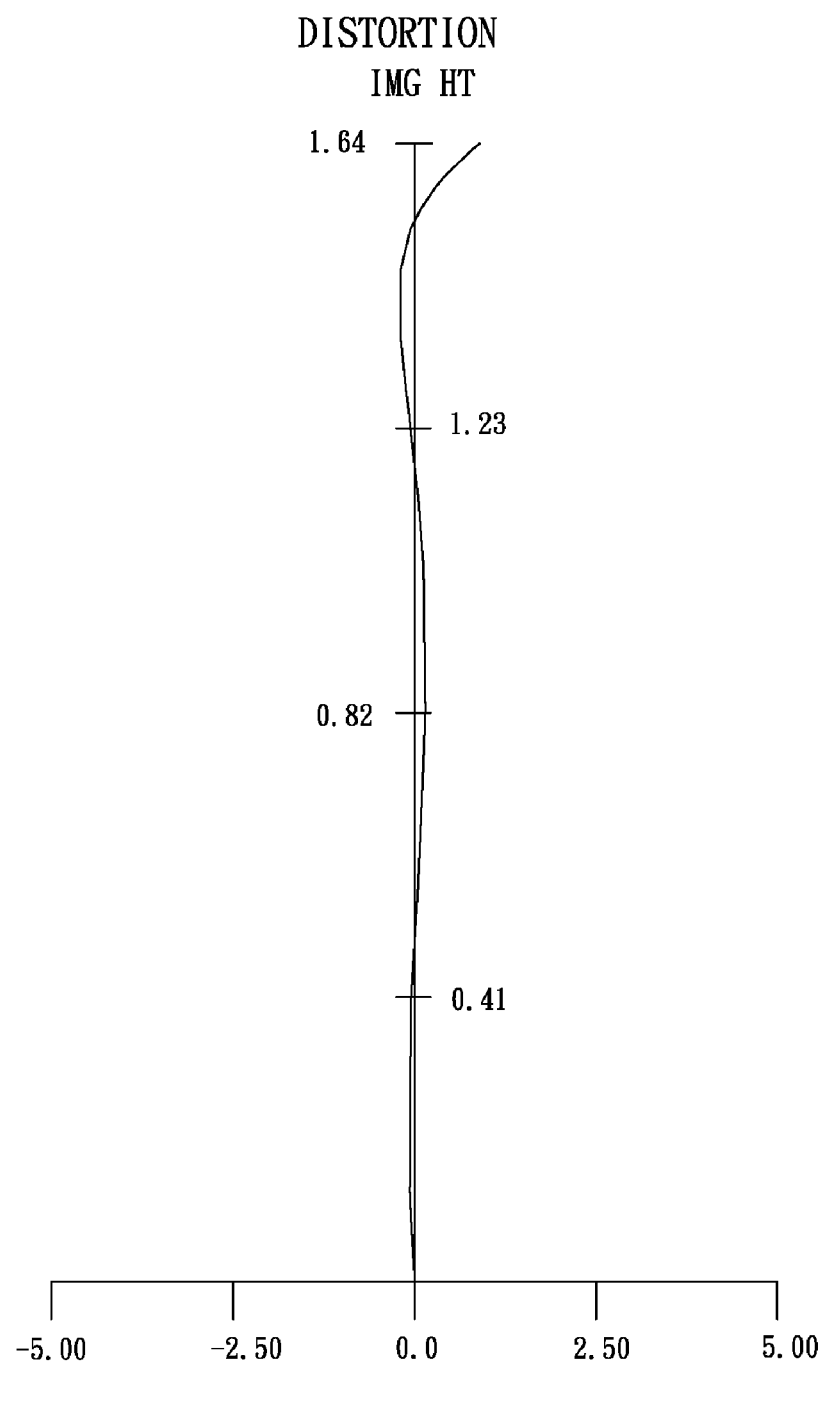
FIG. 6C is a distortion diagram of a slim lens assembly in accordance with a third embodiment of the invention.

By the above arrangements of the lenses and stop ST3, the slim lens assembly 30 of the present embodiment can meet the requirements of optical performance as seen in FIGS. 6A-6C, wherein FIG. 6A shows the longitudinal spherical aberration of the slim lens assembly 30 of the present embodiment, FIG. 6B shows the astigmatic field curves of the slim lens assembly 30 of the present embodiment and FIG. 6C shows the distortion of the slim lens assembly 30 of the present embodiment.

It can be seen from FIG. 6A that the longitudinal spherical aberration in the present embodiment ranges between −0.006 mm to 0.009 mm for the wavelength range between 470 nm to 650 nm. It can be seen from FIG. 6B that the astigmatic field curves of tangential direction and sagittal direction in the present embodiment ranges between −0.015 mm to 0.01 mm. It can be seen from FIG. 6C that the distortion in the present embodiment does not exceed plus or minus 2.5%. It is obvious that the longitudinal spherical aberration, the astigmatic field curves and the distortion of the slim lens assembly 30 of the present embodiment can be corrected effectively and results in better optical performance.

Figure 7:
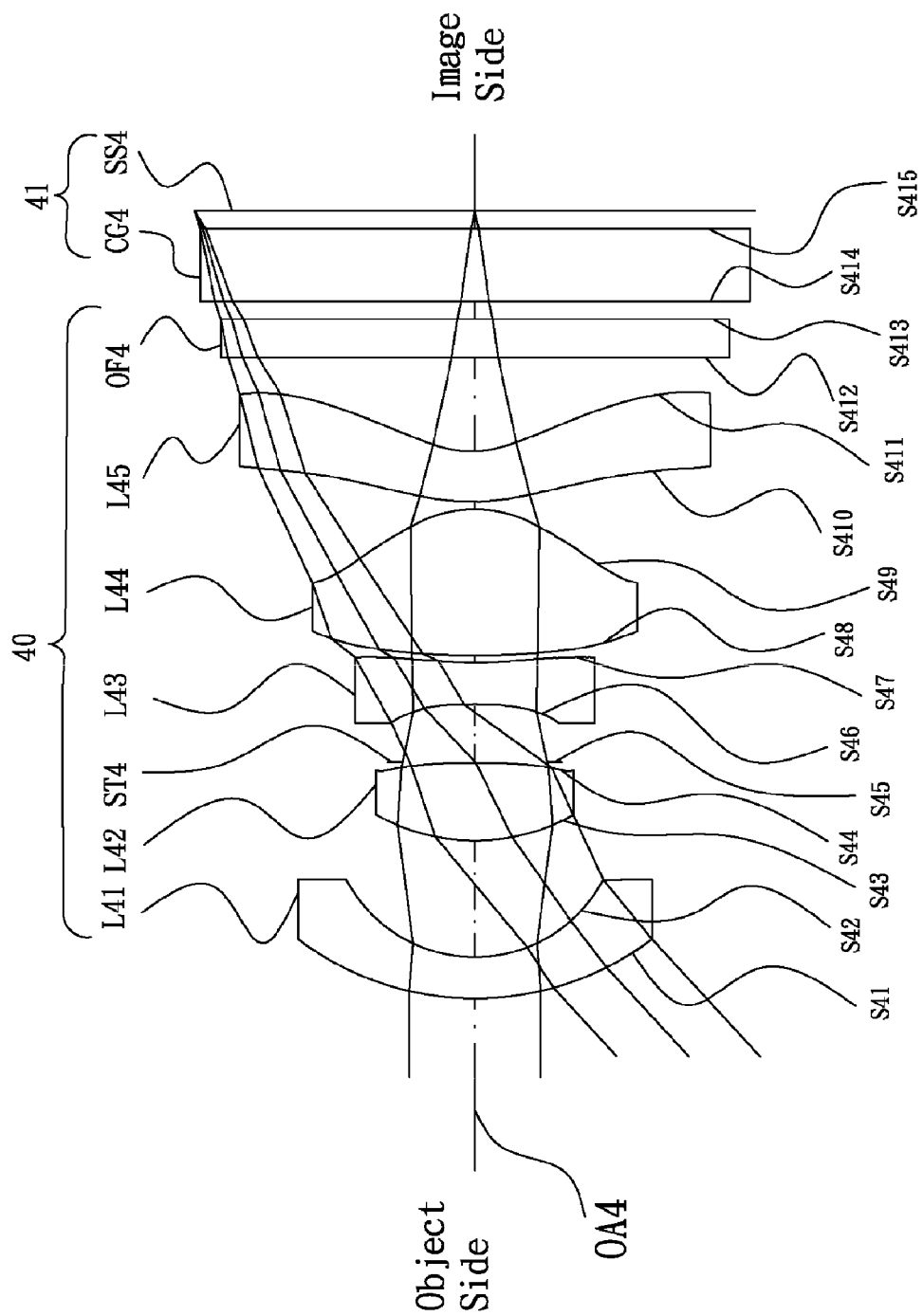
FIG. 7 is a lens layout and optical path diagram of a slim lens assembly in accordance with a fourth embodiment of the invention.

Referring to FIG. 7, FIG. 7 is a lens layout and optical path diagram of the slim lens assembly in accordance with a fourth embodiment of the invention. The Slim lens assembly 40 includes a first lens L41, a second lens L42, a stop ST4, a third lens L43, a fourth lens L44, a fifth lens L45 and a optical filter OF4, all of which are arranged in sequence from an object side to an image side along an optical axis OA4. An image sensor 41 is disposed between the optical filter OF4 and the image side. A sensing surface SS4 of the image sensor 41 is disposed in the image plane. The first lens L41 is made of plastic material. The first lens L41 is a convex-concave lens with negative refractive power, the convex surface S41 of the first lens L41 faces the object side and the concave surface S42 of the first lens L41 faces the image side, wherein both of the convex surface S41 and concave surface S42 are aspheric surfaces. The second lens L42 is made of plastic material. The second lens L42 is a biconvex lens with positive refractive power, the convex surface S43 and convex surface S44 of the second lens L42 both are aspheric surfaces. The third lens L43 is made of plastic material. The third lens L43 is a biconcave lens with negative refractive power, the concave surface S46 and concave surface S47 of the third lens L43 both are aspheric surfaces. The fourth lens L44 is made of plastic material. The fourth lens L44 is a biconvex lens with positive refractive power, the convex surface S48 and convex surface S49 of the fourth lens L44 both are aspheric surfaces. The fifth lens L45 is made of plastic material. The fifth lens L45 is a convex-concave lens with negative refractive power, the convex surface S410 of the fifth lens L45 faces the object side and the concave surface S411 of the fifth lens L45 faces the image side, wherein both of the convex surface S410 and concave surface S411 are aspheric surfaces and the concave surface S411 is an inflecting surface. The optical filter OF4 is made of glass material. The surface S412 and surface S413 of the optical filter OF4 both are plane surfaces. The image sensor 41 includes a cover glass CG4 and a sensor element (not shown). The cover glass CG4 includes a surface S414 and a surface S415 both are plane surfaces, is used to protect sensor surface SS4 of the sensor element from scratch or dust adhesion. By the above design of the lenses and stop ST4, the slim lens assembly 40 which has the optical specifications of a smaller F-number, a larger field of view and a shortened total track, still has high optical performance.

In order to achieve the above purpose and effectively enhance the optical performance, the slim lens assembly 40 of the fourth embodiment of the invention is provided with the optical specifications shown in Table 7, which include the effective focal length, F-number, total track, field of view, radius of curvature of each lens surface, thickness of each lens, refractive index of each lens and Abbe number of each lens.

TABLE 7

Effective Focal Length = 1.73413 mm
F-number = 2.4
Field of View = 85°
Total Track = 4.357 mm

| Surface Number | Radius of Curvature (mm) | Thickness (mm) | Nd | Vd | Remark |
| --- | --- | --- | --- | --- | --- |
| S41 | 1.72452 | 0.230 | 1.535 | 56.1 | The First Lens L41 |
| S42 | 0.84550 | 0.643 | | | |
| S43 | 1.07727 | 0.431 | 1.544 | 56.1 | The Second Lens L42 |
| S44 | −4.48885 | 0.002 | | | |
| S45 | ∞ | 0.321 | | | Stop ST4 |
| S46 | −2.62347 | 0.230 | 1.614 | 25.6 | The Third Lens L43 |
| S47 | 1.69660 | 0.040 | | | |
| S48 | 4.08399 | 0.810 | 1.544 | 56.1 | The Fourth Lens L44 |
| S49 | −0.55711 | 0.040 | | | |
| S410 | 1.22201 | 0.280 | 1.535 | 56.1 | The Fifth Lens L45 |
| S411 | 0.50156 | 0.520 | | | |
| S412 | ∞ | 0.210 | 1.517 | 64.2 | Optical Filter OF4 |
| S413 | ∞ | 0.100 | | | |
| S414 | ∞ | 0.400 | 1.517 | 64.2 | Cover Glass CG4 |
| S415 | ∞ | 0.100 | | | |

In the present embodiment, the conic constant k and the aspheric coefficients A~G of each surface are shown in Table 8.

TABLE 8

| Surface Number | k | A | B | C | D | E | F | G |
| --- | --- | --- | --- | --- | --- | --- | --- | --- |
| S41 | −9.56839E−01 | 1.04754E−01 | −7.71607E−02 | 1.14317E−01 | −9.62937E−02 | −7.32032E−02 | 1.56642E−01 | −7.50325E−02 |
| S42 | 0.00000E+00 | 1.18106E−01 | −2.19474E−02 | 4.08970E−01 | −6.00490E−01 | 2.05564E−01 | 6.81827E−01 | 1.38198E+00 |
| S43 | 0.00000E+00 | 9.82604E−03 | 1.28927E−01 | −1.67288E+00 | 5.57444E+00 | −1.57962E+00 | −6.72301E+01 | 9.92663E+01 |
| S44 | 0.00000E+00 | −2.37429E−01 | −7.73078E−01 | 4.45648E+00 | −3.99104E+00 | −3.90382E+01 | −3.52207E+02 | 1.77180E+03 |
| S46 | 0.00000E+00 | −1.62919E+00 | 2.45126E+00 | −8.38903E+00 | 1.18134E+01 | 7.75125E−01 | 8.68475E+01 | −4.67851E+02 |
| S47 | −3.71985E+01 | −4.11486E−01 | 4.24843E−01 | 1.23724E−01 | −7.36488E−02 | −1.99481E−01 | −1.13396E+00 | 2.06927E+00 |
| S48 | 0.00000E+00 | −2.43317E−02 | 6.85630E−02 | 1.58899E−01 | −1.32888E−01 | −1.20758E−01 | 1.78191E−01 | −5.66128E−02 |
| S49 | −3.61463E+00 | −4.38837E−01 | 4.87905E−01 | −6.61933E−02 | 6.34246E−02 | 9.37535E−02 | 3.94567E−02 | −1.40011E−01 |

TABLE 8-continued

| Surface Number | k | A | B | C | D | E | F | G |
|---|---|---|---|---|---|---|---|---|
| S410 | −6.16485E+00 | −1.65706E−01 | 9.82102E−02 | −1.50929E−02 | −2.15398E−02 | 6.09912E−03 | 6.59738E−03 | −2.51547E−03 |
| S411 | −4.48361E+00 | −1.50763E−01 | 8.70987E−02 | −4.43842E−02 | 1.01071E−02 | 2.75046E−05 | −8.62990E−04 | 2.85654E−04 |

The slim lens assembly 40 of the present embodiment wherein the effective focal length f=1.73413 mm, BFL=1.330 mm, TT=4.357 mm, $R_{11}$=1.72452 mm, $R_{12}$=0.84550 mm, $f_1$=−3.403594 mm, $R_{21}$=1.07727 mm, $R_{22}$=−4.48885 mm, $f_2$=1.636074 mm, $R_{41}$=4.08399 mm, $R_{42}$=−0.55711 mm and $f_4$=0.956915 mm. The calculated values of various conditions fully satisfy the requirements of condition (1), condition (2), condition (3), condition (4), condition (5), condition (6) and condition (7) which are listed in BRIEF SUMMARY OF THE INVENTION. The calculated values of various conditions are as below:

$BFL/TT$=0.3052

$(R_{11}-R_{12})/(R_{11}+R_{12})$=0.3420

$f_1/f$=−1.9627

$(R_{21}-R_{22})/(R_{21}+R_{22})$=−1.6315

$f_2/f$=0.9435

$(R_{41}-R_{42})/(R_{41}+R_{42})$=1.3159

$f_4/f$=0.5518

Figure 8A:
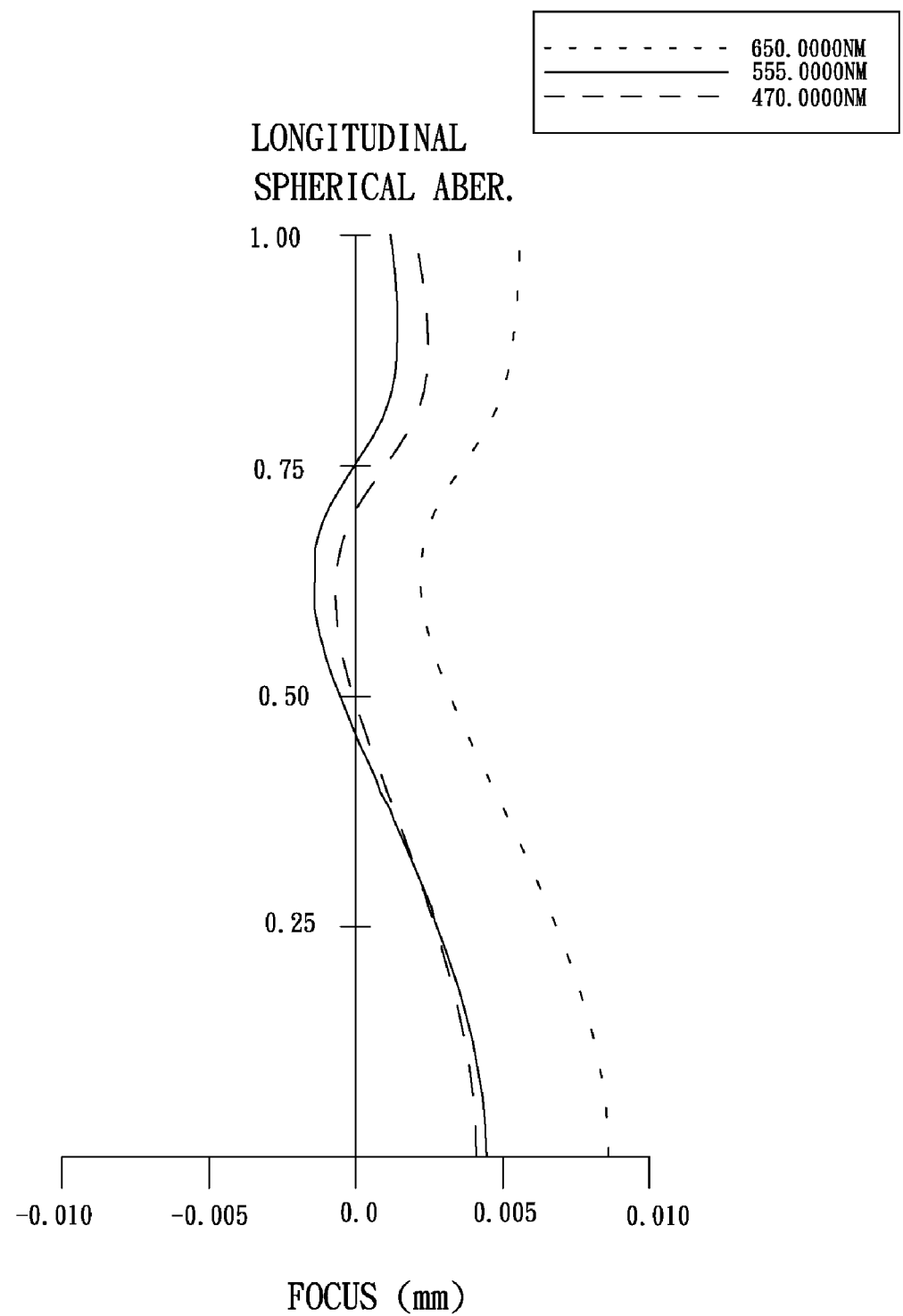
FIG. 8A is a longitudinal spherical aberration diagram of a slim lens assembly in accordance with a fourth embodiment of the invention.
Figure 8B:
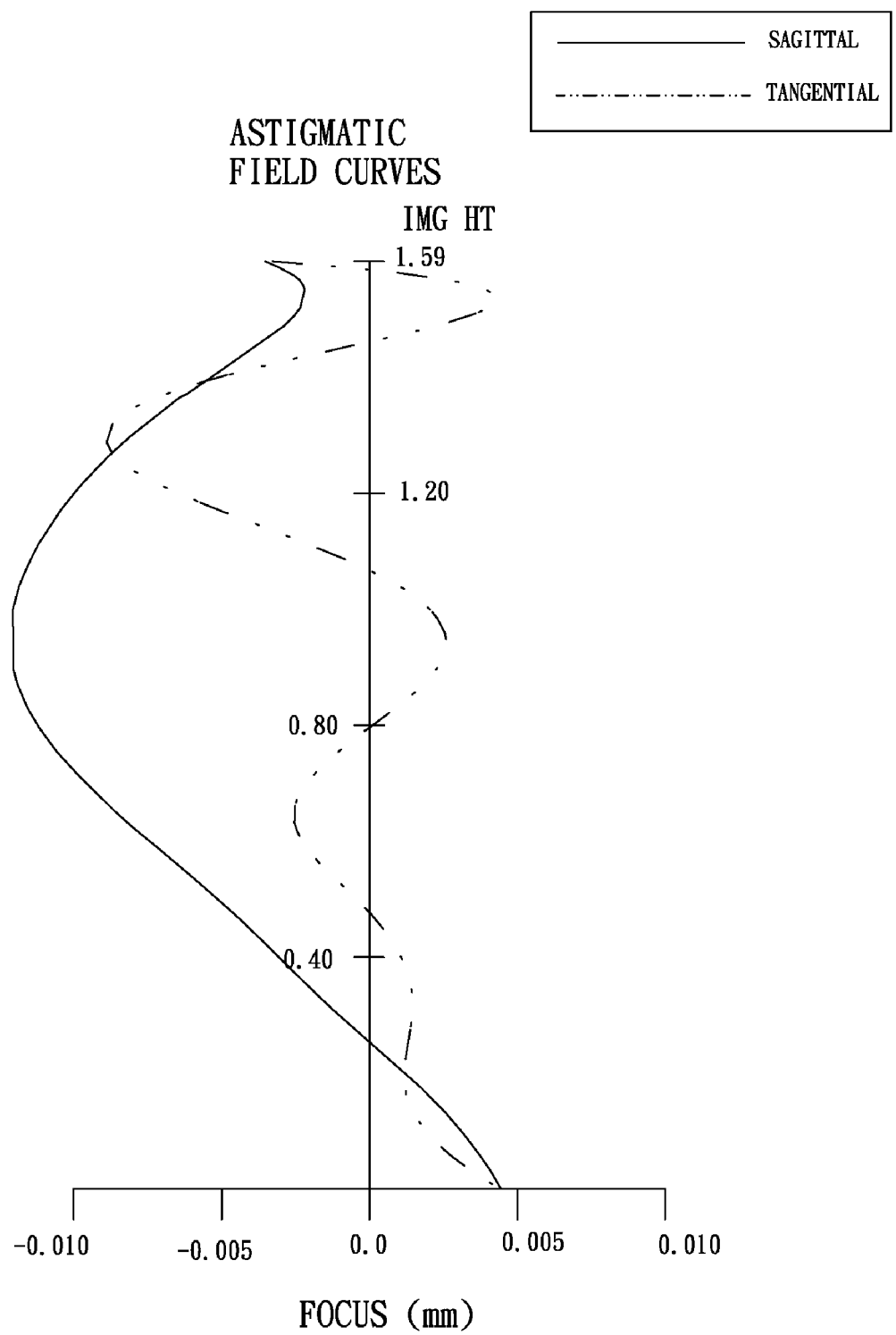
FIG. 8B is an astigmatic field curves diagram of a slim lens assembly in accordance with a fourth embodiment of the invention.
Figure 8C:
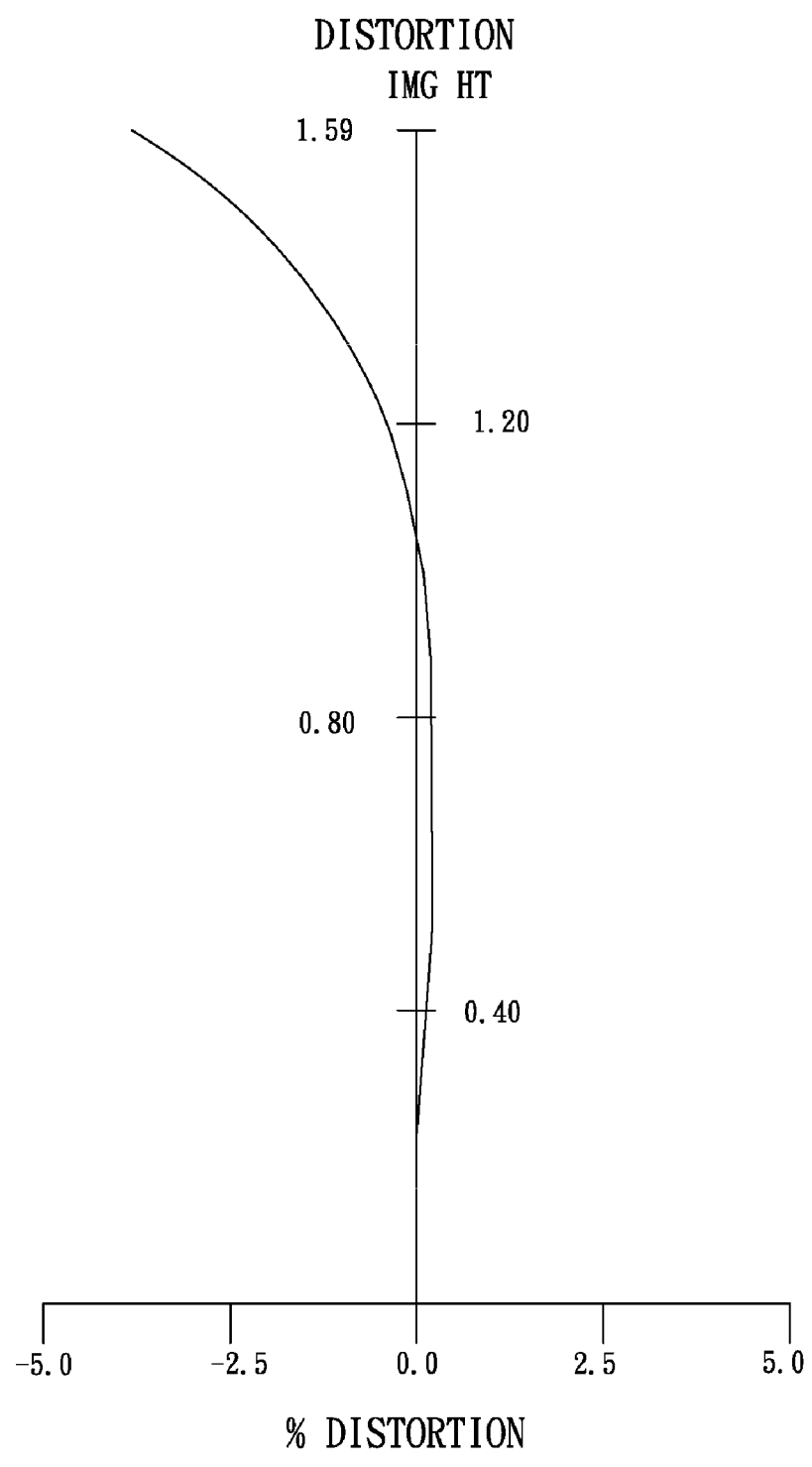
FIG. 8C is a distortion diagram of a slim lens assembly in accordance with a fourth embodiment of the invention.

By the above arrangements of the lenses and stop ST4, the slim lens assembly 40 of the present embodiment can meet the requirements of optical performance as seen in FIGS. 8A-8C, wherein FIG. 8A shows the longitudinal spherical aberration of the slim lens assembly 40 of the present embodiment, FIG. 8B shows the astigmatic field curves of the slim lens assembly 40 of the present embodiment and FIG. 8C shows the distortion of the slim lens assembly 40 of the present embodiment.

It can be seen from FIG. 8A that the longitudinal spherical aberration in the present embodiment ranges between −0.005 mm to 0.01 mm for the wavelength range between 470 nm to 650 nm. It can be seen from FIG. 8B that the astigmatic field curves of tangential direction and sagittal direction in the present embodiment ranges between −0.015 mm to 0.005 mm. It can be seen from FIG. 8C that the distortion in the present embodiment does not exceed plus or minus 5%. It is obvious that the longitudinal spherical aberration, the astigmatic field curves and the distortion of the slim lens assembly 40 of the present embodiment can be corrected effectively and results in better optical performance.

Figure 9:
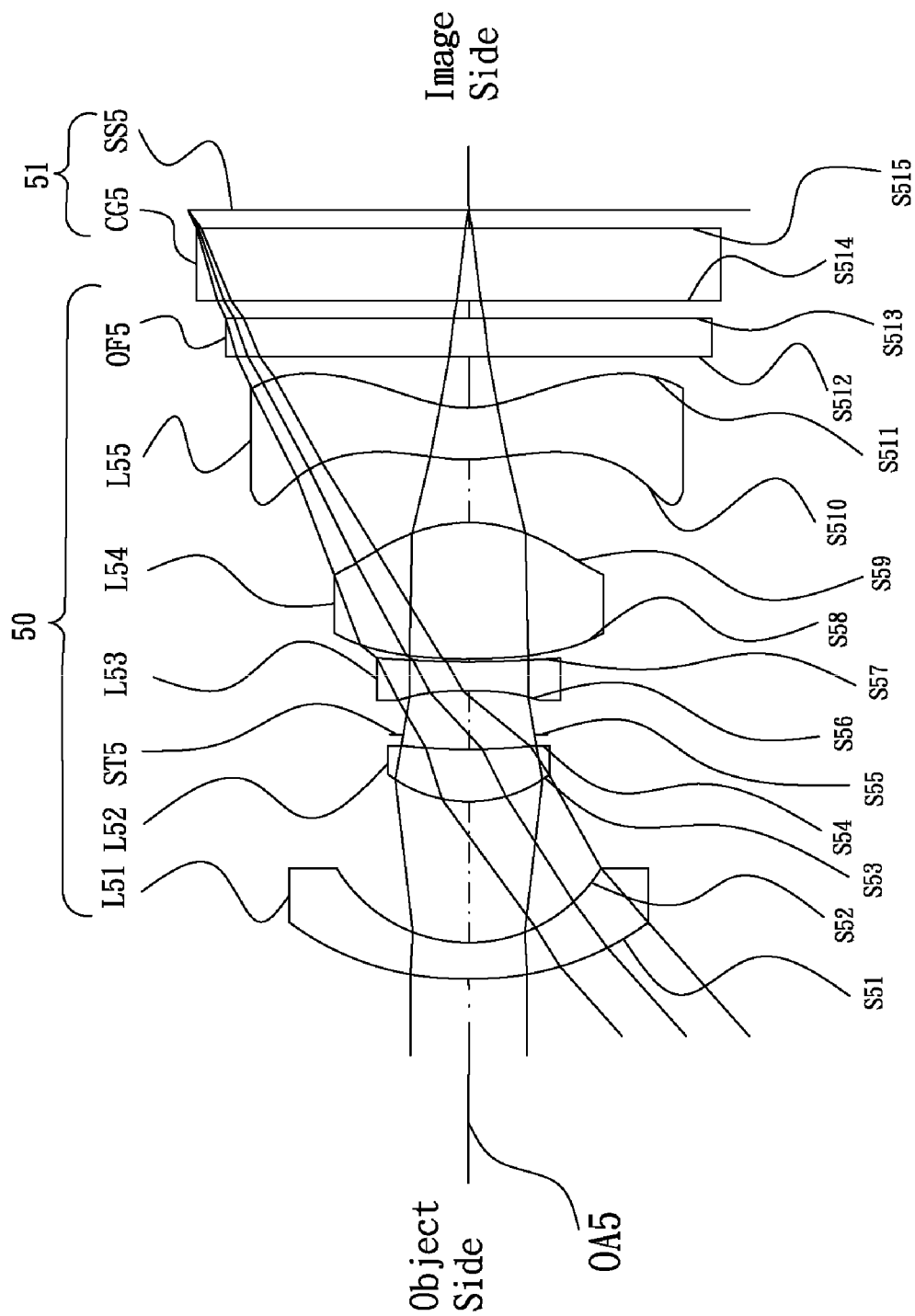
FIG. 9 is a lens layout and optical path diagram of a slim lens assembly in accordance with a fifth embodiment of the invention.

Referring to FIG. 9, FIG. 9 is a lens layout and optical path diagram of the slim lens assembly in accordance with a fifth embodiment of the invention. The Slim lens assembly 50 includes a first lens L51, a second lens L52, a stop ST5, a third lens L53, a fourth lens L54, a fifth lens L55 and a optical filter OF5, all of which are arranged in sequence from an object side to an image side along an optical axis OA5. An image sensor 51 is disposed between the optical filter OF5 and the image side. A sensing surface SS5 of the image sensor 51 is disposed in the image plane. The first lens L51 is made of plastic material. The first lens L51 is a convex-concave lens with negative refractive power, the convex surface S51 of the first lens L51 faces the object side and the concave surface S52 of the first lens L51 faces the image side, wherein both of the convex surface S51 and concave surface S52 are aspheric surfaces. The second lens L52 is made of plastic material. The second lens L52 is a convex-concave lens with positive refractive power, the convex surface S53 of the second lens L52 faces the object side and the concave surface S54 of the second lens L52 faces the image side, wherein both of the convex surface S53 and concave surface S54 are aspheric surfaces. The third lens L53 is made of plastic material. The third lens L53 is a biconcave lens with negative refractive power, the concave surface S56 and concave surface S57 of the third lens L53 both are aspheric surfaces. The fourth lens L54 is made of plastic material. The fourth lens L54 is a biconvex lens with positive refractive power, the convex surface S58 and convex surface S59 of the fourth lens L54 both are aspheric surfaces. The fifth lens L55 is made of plastic material. The fifth lens L55 is a convex-concave lens with negative refractive power, the convex surface S510 of the fifth lens L55 faces the object side and the concave surface S511 of the fifth lens L55 faces the image side, wherein both of the convex surface S510 and concave surface S511 are aspheric surfaces and both of the convex surface S510 and concave surface S511 are inflecting surfaces. The optical filter OF5 is made of glass material. The surface S512 and surface S513 of the optical filter OF5 both are plane surfaces. The image sensor 51 includes a cover glass CG5 and a sensor element (not shown). The cover glass CG5 includes a surface S514 and a surface S515 both are plane surfaces, is used to protect sensor surface SS5 of the sensor element from scratch or dust adhesion. By the above design of the lenses and stop ST5, the slim lens assembly 50 which has the optical specifications of a smaller F-number, a larger field of view and a shortened total track, still has high optical performance.

In order to achieve the above purpose and effectively enhance the optical performance, the slim lens assembly 50 of the fifth embodiment of the invention is provided with the optical specifications shown in Table 9, which include the effective focal length, F-number, total track, field of view, radius of curvature of each lens surface, thickness of each lens, refractive index of each lens and Abbe number of each lens.

TABLE 9

Effective Focal Length = 1.795 mm
F-number = 2.8
Field of View = 83°
Total Track = 4.252 mm

| Surface Number | Radius of Curvature (mm) | Thickness (mm) | Nd | Vd | Remark |
|---|---|---|---|---|---|
| S51 | 1.97938 | 0.199 | 1.535 | 56.1 | The First Lens L51 |
| S52 | 0.87561 | 0.780 | | | |
| S53 | 0.79585 | 0.290 | 1.535 | 56.1 | The Second Lens L52 |
| S54 | 5.32183 | 0.080 | | | |
| S55 | ∞ | 0.242 | | | Stop ST5 |
| S56 | −2.55574 | 0.160 | 1.614 | 25.6 | The Third Lens L53 |
| S57 | 3.75814 | 0.016 | | | |
| S58 | 2.94552 | 0.755 | 1.485 | 84.2 | The Fourth Lens L54 |
| S59 | −0.82617 | 0.354 | | | |

TABLE 9-continued

Effective Focal Length = 1.795 mm
F-number = 2.8
Field of View = 83°
Total Track = 4.252 mm

| Surface Number | Radius of Curvature (mm) | Thickness (mm) | Nd | Vd | Remark |
|---|---|---|---|---|---|
| S510 | 1.19189 | 0.287 | 1.535 | 56.1 | The Fifth Lens L55 |
| S511 | 0.61600 | 0.278 | | | |
| S512 | ∞ | 0.210 | 1.517 | 64.2 | Optical Filter OF5 |
| S513 | ∞ | 0.100 | | | |
| S514 | ∞ | 0.400 | 1.517 | 64.2 | Cover Glass CG5 |
| S515 | ∞ | 0.100 | | | |

In the present embodiment, the conic constant k and the aspheric coefficients A~G of each surface are shown in Table 10.

TABLE 10

| Surface Number | k | A | B | C | D | E | F | G |
|---|---|---|---|---|---|---|---|---|
| S51 | −2.22647E+00 | 7.00574E−02 | −3.82304E−02 | 1.41902E−01 | −9.42417E−02 | −9.11057E−02 | 1.61223E−01 | −6.19960E−02 |
| S52 | 0.00000E+00 | 3.62545E−02 | −2.27435E−01 | 1.07560E+00 | −1.15915E+00 | −4.55816E−02 | 1.81374E−01 | 2.14491E+00 |
| S53 | 0.00000E+00 | 1.71868E−01 | −2.66885E−02 | 7.94102E+00 | −1.70676E+01 | 7.39468E+00 | 1.78491E+01 | 1.14498E+03 |
| S54 | 2.52478E+01 | 1.48814E−01 | 3.89027E−01 | 6.50316E+00 | −8.52154E+00 | 1.31915E+01 | 1.18607E+02 | 2.91138E+03 |
| S56 | 0.00000E+00 | −9.04360E−01 | −2.31460E−01 | 6.75566E−01 | −1.07328E+01 | 8.45393E+00 | 9.25065E+01 | −4.61568E+02 |
| S57 | −3.59378E+01 | −2.82690E−01 | 6.28344E−01 | −2.00508E−01 | 8.04516E−01 | −3.13176E−01 | −1.60531E+00 | −5.80542E+00 |
| S58 | 0.00000E+00 | 9.13976E−02 | 1.68068E−01 | −4.98559E−02 | 7.01687E−03 | −2.56980E−01 | 2.25395E−01 | 4.28616E−01 |
| S59 | −1.94849E+00 | −3.01258E−01 | 5.34490E−01 | −2.72308E−01 | 2.06990E−01 | 4.75907E−01 | 7.54172E−02 | −6.81176E−02 |
| S510 | −1.61189E+01 | −5.88825E−01 | 3.41816E−01 | 7.04064E−02 | −1.41575E−01 | −8.83004E−02 | 4.35925E−03 | 5.99481E−02 |
| S511 | −4.52064E+00 | −3.70194E−01 | 2.82057E−01 | −1.36599E−01 | 1.45296E−02 | 4.26998E−03 | −5.99459E−04 | 4.17912E−04 |

The slim lens assembly 50 of the present embodiment wherein the effective focal length f=1.795 mm, BFL=1.088 mm, TT=4.252 mm, $R_{11}$=1.97938 mm, $R_{12}$=0.87561 mm, $f_1$=−3.121058 mm, $R_{21}$=0.79585 mm, $R_{22}$=5.32183 mm, $f_2$=1.704792 mm, $R_{41}$=2.94552 mm, $R_{42}$=−0.82617 mm and $f_4$=1.420195 mm. The calculated values of various conditions fully satisfy the requirements of condition (1), condition (2), condition (3), condition (4), condition (5), condition (6) and condition (7) which are listed in BRIEF SUMMARY OF THE INVENTION. The calculated values of various conditions are as below:

BFL/$TT$=0.2560

$(R_{11}-R_{12})/(R_{11}+R_{12})$=0.3866

$f_1/f$=−1.7388

$(R_{21}-R_{22})/(R_{21}+R_{22})$=−0.7398

$f_2/f$=0.9497

$(R_{41}-R_{42})/(R_{41}+R_{42})$=1.7796

$f_4/f$=0.7912

Figure 10A:
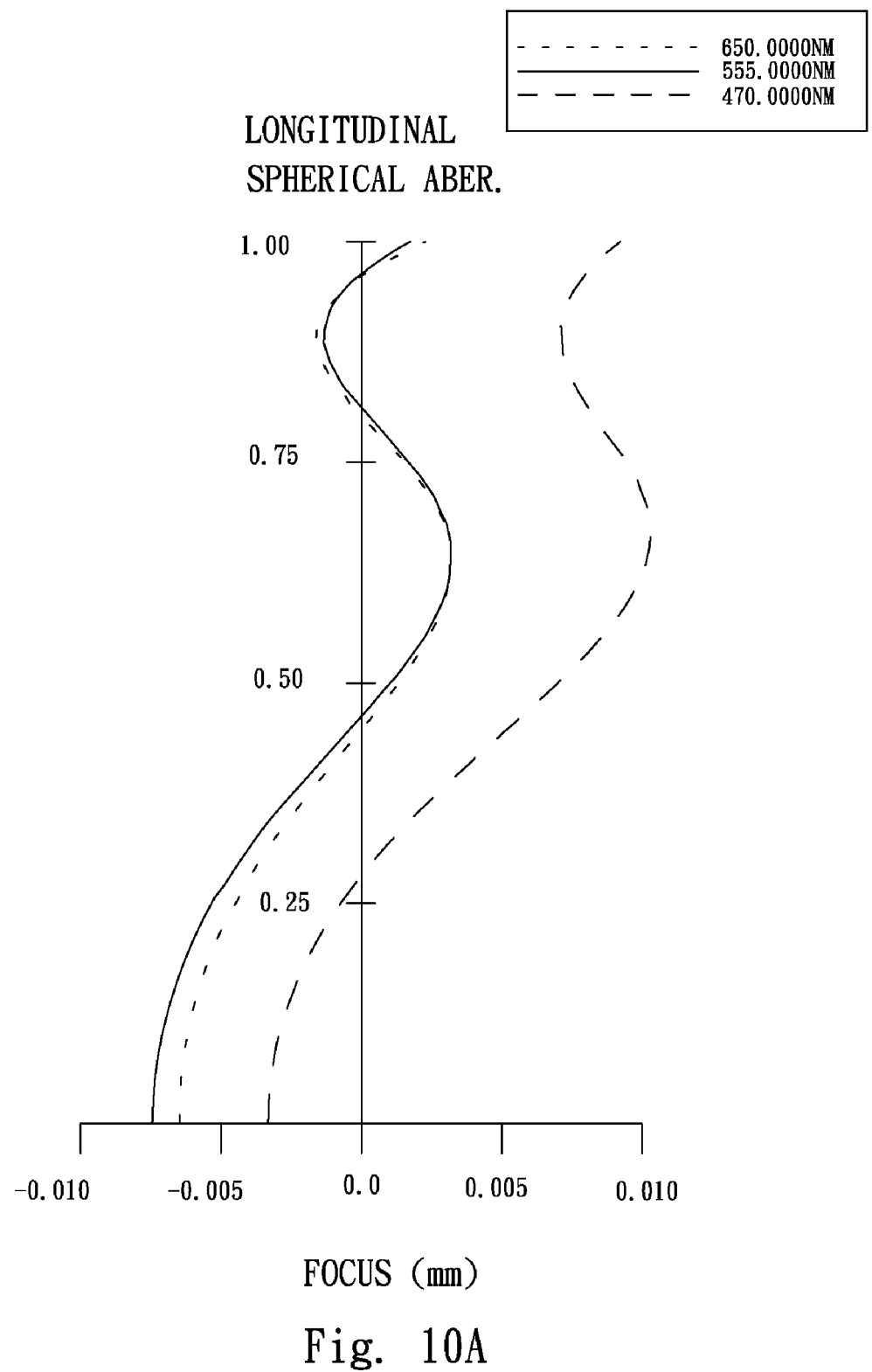
FIG. 10A is a longitudinal spherical aberration diagram of a slim lens assembly in accordance with a fifth embodiment of the invention.
Figure 10B:
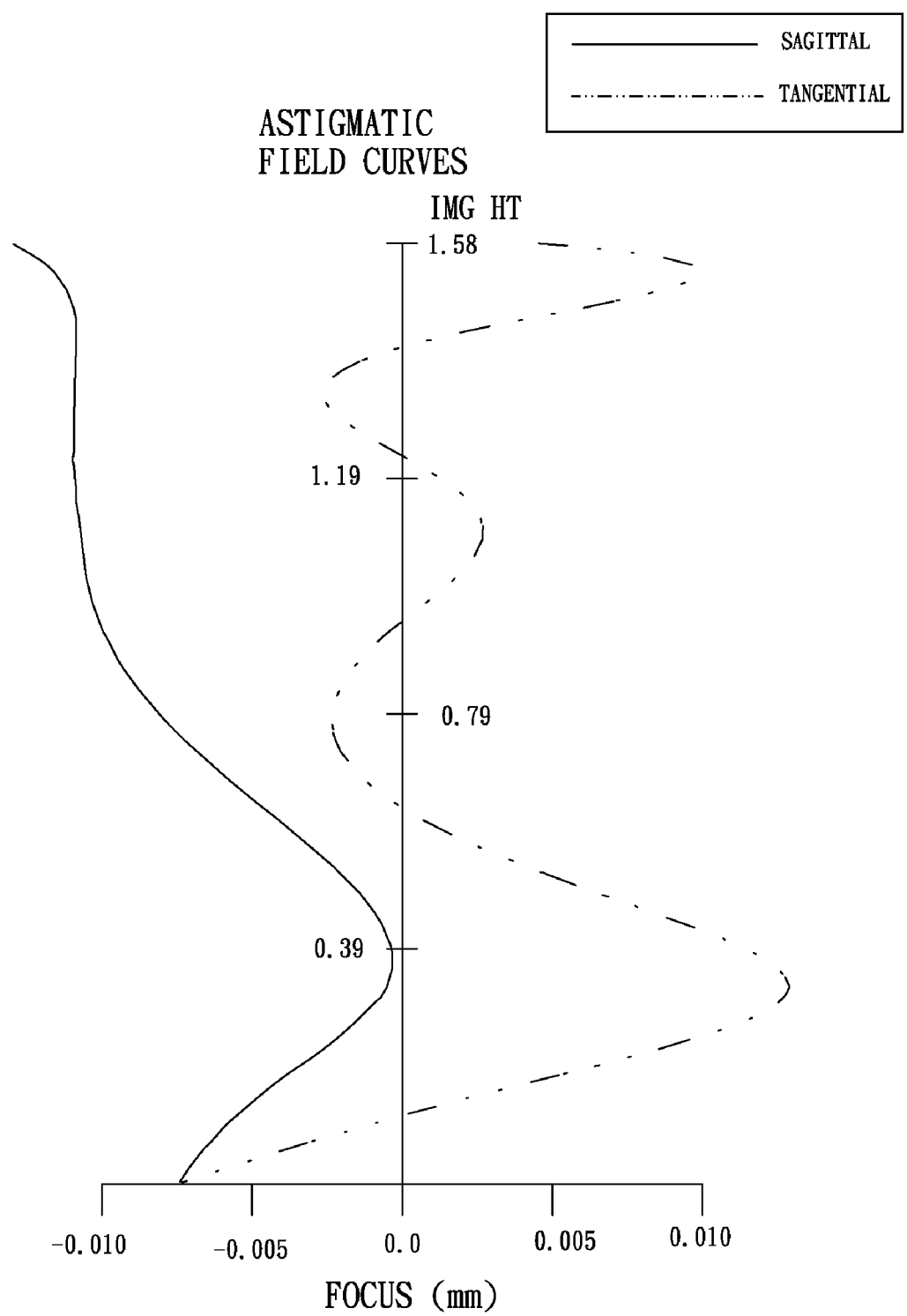
FIG. 10B is an astigmatic field curves diagram of a slim lens assembly in accordance with a fifth embodiment of the invention.
Figure 10C:
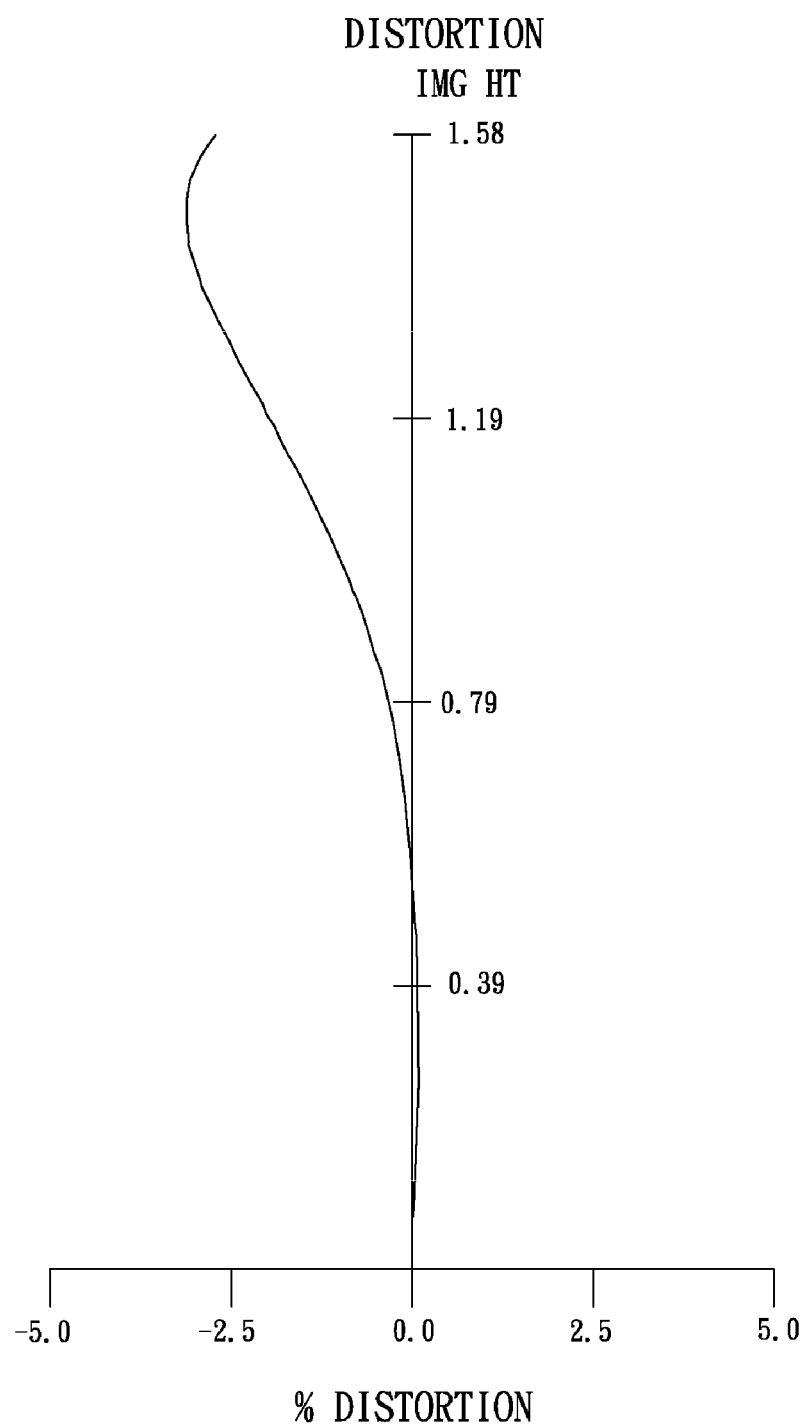
FIG. 10C is a distortion diagram of a slim lens assembly in accordance with a fifth embodiment of the invention.

By the above arrangements of the lenses and stop ST5, the slim lens assembly 50 of the present embodiment can meet the requirements of optical performance as seen in FIGS. 10A-10C, wherein FIG. 10A shows the longitudinal spherical aberration of the slim lens assembly 50 of the present embodiment, FIG. 10B shows the astigmatic field curves of the slim lens assembly 50 of the present embodiment and FIG. 10C shows the distortion of the slim lens assembly 50 of the present embodiment.

It can be seen from FIG. 10A that the longitudinal spherical aberration in the present embodiment ranges between −0.01 mm to 0.015 mm for the wavelength range between 470 nm to 650 nm. It can be seen from FIG. 10B that the astigmatic field curves of tangential direction and sagittal direction in the present embodiment ranges between −0.015 mm to 0.015 mm. It can be seen from FIG. 10C that the distortion in the present embodiment does not exceed plus or minus 5%. It is obvious that the longitudinal spherical aberration, the astigmatic field curves and the distortion of the slim lens assembly 50 of the present embodiment can be corrected effectively and results in better optical performance.

In the invention, all of the lenses can be made of plastic material or glass material. Alternatively, some lenses are made of plastic material and the others are made of glass material. Specifically, all of the lenses are made of plastic material in the first, second, third, and fourth embodiment, while some lenses are made of plastic material and the others are made of glass material in the fifth embodiment. The first lens L51, the second lens L52, the third lens L53 and the fifth lens L55 of the fifth embodiment are made of plastic material, but the fourth lens L54 of the fifth embodiment is made of glass material that is the most difference between the fifth embodiment and the first to fourth embodiments. In the first to fourth embodiments, because all of the lenses are made of plastic material, the effective focal length of the slim lens assembly 10, slim lens assembly 20, slim lens assembly 30 and slim lens assembly 40 are easily influenced by environmental temperature change. This kind of slim lens assembly is easily out of focus when the environmental temperature changes greatly, so this type of slim lens assembly is only suitable for smaller environmental temperature change. In the fifth embodiment, therefore, the fourth lens L54 is made of glass material to reduce the influence of environmental temperature change on the effective focal length. The slim lens assembly 50 of the fifth embodiment is in focus even in a larger temperature difference environment, thus especially suitable to field prey tracker, and never out of focus to clearly capture image of prey in night as well as in day.

While the invention has been described by way of examples and in terms of embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A slim lens assembly comprising a first lens, a second lens, a third lens, a fourth lens and a fifth lens, all of which are arranged in sequence from an object side to an image side along an optical axis, wherein:

the first lens is a convex-concave lens with negative refractive power and comprises a convex surface facing the object side and a concave surface facing the image side;

the second lens is with positive refractive power;

the third lens is a biconcave lens with negative refractive power;

the fourth lens is a biconvex lens with positive refractive power;

the fifth lens is a convex-concave lens with negative refractive power and comprises a convex surface facing the object side and a concave surface facing the image side; and the slim lens assembly satisfies:

$$0.2560 \leq BFL/TT \leq 0.3052$$

wherein BFL is a back focal length of the slim lens assembly, and TT is a distance from the convex surface of the first lens to an image plane along the optical axis.

2. The slim lens assembly as claimed in claim 1, wherein the first lens satisfies:

$$0.2883 \leq (R_{11}R_{12})/(R_{11}+R_{12}) \leq 0.3866$$

$$-3.0946 \leq f_1/f \leq -1.7388$$

wherein $R_{11}$ is a radius of curvature of the convex surface of the first lens, $R_{12}$ is a radius of curvature of the concave surface of the first lens, f is an effective focal length of the slim lens assembly and $f_1$ is an effective focal length of the first lens.

3. The slim lens assembly as claimed in claim 2, wherein the second lens satisfies:

$$-1.6692 \leq (R_{21}-R_{22})/(R_{21}+R_{22}) \leq -0.7398$$

$$0.9108 \leq f_2/f \leq 1.1103$$

wherein $R_{21}$ is a radius of curvature of an object side surface of the second lens, $R_{22}$ is a radius of curvature of an image side surface of the second lens, f is the effective focal length of the slim lens assembly and $f_2$ is an effective focal length of the second lens.

4. The slim lens assembly as claimed in claim 3, wherein the fourth lens satisfies:

$$1.2989 \leq (R_{41}-R_{42})/(R_{41}+R_{42}) \leq 1.7796$$

$$0.4745 \leq f_4/f \leq 0.7912$$

wherein $R_{41}$ is a radius of curvature of an object side surface of the fourth lens, $R_{42}$ is a radius of curvature of an image side surface of the fourth lens, f is the effective focal length of the slim lens assembly and $f_4$ is an effective focal length of the fourth lens.

5. The slim lens assembly as claimed in claim 1, wherein the first lens is made of plastic or glass material.

6. The slim lens assembly as claimed in claim 1, wherein the convex surface of the first lens is an aspheric surface, or the concave surface of the first lens is an aspheric surface, or both of the convex surface and the concave surface of the first lens are aspheric surfaces.

7. The slim lens assembly as claimed in claim 1, wherein the second lens is a biconvex lens or a convex-concave lens.

8. The slim lens assembly as claimed in claim 1, wherein the second lens is made of plastic or glass material.

9. The slim lens assembly as claimed in claim 1, wherein the second lens comprises two surfaces, at least one of which is an aspheric surface or both of which are aspheric surfaces.

10. The slim lens assembly as claimed in claim 1, wherein the third lens is made of plastic or glass material.

11. The slim lens assembly as claimed in claim 1, wherein the third lens comprises two concave surfaces, at least one of which is an aspheric surface or both of which are aspheric surfaces.

12. The slim lens assembly as claimed in claim 1, wherein the fourth lens is made of plastic or glass material.

13. The slim lens assembly as claimed in claim 1, wherein the fourth lens comprises two convex surfaces, at least one of which is an aspheric surface or both of which are aspheric surfaces.

14. The slim lens assembly as claimed in claim 1, wherein the fifth lens is made of plastic or glass material.

15. The slim lens assembly as claimed in claim 1, wherein the convex surface of the fifth lens is an aspheric surface, or the concave surface of the fifth lens is an aspheric surface, or both of the convex surface and the concave surface of the fifth lens are aspheric surfaces.

16. The slim lens assembly as claimed in claim 1, further comprising an optical filter disposed between the fifth lens and the image side.

17. The slim lens assembly as claimed in claim 1, further comprising a stop disposed between the second lens and the third lens.

18. A slim lens assembly comprising a first lens, a second lens, a third lens, a fourth lens and a fifth lens, all of which are arranged in sequence from an object side to an image side along an optical axis, wherein:

the first lens is a convex-concave lens with negative refractive power and comprises a convex surface facing the object side and a concave surface facing the image side;

the second lens is with positive refractive power;

the third lens is a biconcave lens with negative refractive power;

the fourth lens is a biconvex lens with positive refractive power;

the fifth lens is a convex-concave lens with negative refractive power and comprises an inflecting surface facing the object side, or an inflecting surface facing the image side, or two inflecting surfaces respectively facing the object side and the image side; and the slim lens assembly satisfies:

$$0.2560 \leq BFL/TT \leq 0.3052$$

wherein BFL is a back focal length of the slim lens assembly, and TT is a distance from the convex surface of the first lens to an image plane along the optical axis.

* * * * *